United States Patent
Kurotani

(10) Patent No.: US 10,443,516 B2
(45) Date of Patent: Oct. 15, 2019

(54) METHOD OF ESTIMATING ANTIKNOCK PROPERTIES OF MULTI-FUEL INJECTION INTERNAL COMBUSTION ENGINE

(71) Applicant: HONDA MOTOR CO., LTD., Tokyo (JP)

(72) Inventor: Tadashi Kurotani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 15/060,602

(22) Filed: Mar. 4, 2016

(65) Prior Publication Data

US 2016/0290250 A1 Oct. 6, 2016

(30) Foreign Application Priority Data

Apr. 1, 2015 (JP) .................................. 2015-075306

(51) Int. Cl.
*F02D 19/06* (2006.01)
*F02D 35/02* (2006.01)
(Continued)

(52) U.S. Cl.
CPC ..... *F02D 19/0626* (2013.01); *F02D 19/0649* (2013.01); *F02D 19/081* (2013.01);
(Continued)

(58) Field of Classification Search
CPC ........ F02D 2200/0612; F02D 2200/1002–101; F02D 2200/0611; F02D 35/027;
(Continued)

(56) References Cited

U.S. PATENT DOCUMENTS

| | | | | |
|---|---|---|---|---|
| 4,882,695 A | * | 11/1989 | Mieno | F02D 37/02 701/111 |
| 6,332,448 B1 | * | 12/2001 | Ilyama | F02D 19/0605 123/304 |
| 6,951,202 B2 | * | 10/2005 | Oda | F02D 19/081 123/299 |
| 6,990,955 B2 | * | 1/2006 | Niimi | F02D 35/027 123/406.3 |

(Continued)

FOREIGN PATENT DOCUMENTS

| | | |
|---|---|---|
| JP | 2005-2914 | 1/2005 |
| JP | 2006-017077 | 1/2006 |

OTHER PUBLICATIONS

Japanese Office Action for corresponding JP Application No. 2015-075306, dated Aug. 23, 2016.

*Primary Examiner* — Erick R Solis
*Assistant Examiner* — Robert A Werner
(74) *Attorney, Agent, or Firm* — Mori & Ward, LLP

(57) ABSTRACT

A method of estimating antiknock properties of a multi-fuel injection internal combustion engine includes: acquiring a first antiknock property-correlated parameter value while only a first fuel having a low octane rating is injected in a first load range; estimating a first antiknock property of the first fuel based on the first antiknock property-correlated parameter value; acquiring a second antiknock property-correlated parameter value while the first fuel and a second fuel which has a high octane rating higher than the low octane rating are injected in a second load range higher than the first load range; and estimating a second antiknock property of the second fuel based on the second antiknock property-correlated parameter value and the first antiknock property of the first fuel.

9 Claims, 14 Drawing Sheets

(51) Int. Cl.
  *F02P 5/152* (2006.01)
  *F02D 19/08* (2006.01)
  *F02D 41/00* (2006.01)
  *F02D 41/14* (2006.01)

(52) U.S. Cl.
  CPC ....... *F02D 35/027* (2013.01); *F02D 41/0025* (2013.01); *F02P 5/1527* (2013.01); *F02D 41/1456* (2013.01); *F02D 41/1473* (2013.01); *F02D 2200/0612* (2013.01); *Y02T 10/36* (2013.01); *Y02T 10/46* (2013.01)

(58) Field of Classification Search
  CPC ......... F02D 35/028; F02D 19/06–0615; F02D 19/0623; F02D 19/0634; F02D 19/0636; F02D 19/0649; G01L 23/22–225
  USPC .................... 73/114.02–114.12, 35.01, 35.13
  See application file for complete search history.

(56) References Cited

U.S. PATENT DOCUMENTS

| | | | | |
|---|---|---|---|---|
| 7,406,947 | B2* | 8/2008 | Lewis | F02B 63/02 123/1 A |
| 7,603,225 | B2* | 10/2009 | Araki | F02D 15/02 123/435 |
| 8,516,991 | B2* | 8/2013 | Tanno | F02D 35/028 123/304 |
| 9,382,854 | B2* | 7/2016 | Leone | F02D 19/0649 |
| 2002/0139111 | A1* | 10/2002 | Ueda | B01D 61/36 60/285 |
| 2006/0118085 | A1* | 6/2006 | Oda | F02D 19/081 123/406.3 |
| 2008/0289600 | A1* | 11/2008 | Kurotani | F02D 19/081 123/304 |

\* cited by examiner

METHOD OF ESTIMATING ANTIKNOCK PROPERTIES OF MULTI-FUEL INJECTION INTERNAL COMBUSTION ENGINE

CROSS-REFERENCE TO RELATED APPLICATIONS

The present application claims priority under 35 U.S.C. § 119 to Japanese Patent Application No. 2015-075306, filed Apr. 1, 2015, entitled "Method of Estimating Antiknock Properties of Multi-Fuel Injection Internal Combustion Engine." The contents of this application are incorporated herein by reference in their entirety.

BACKGROUND

Field of the Invention

The present disclosure relates to a method of estimating antiknock properties of a multi-fuel injection internal combustion engine.

Discussion of the Background

As fuels for internal combustion engines, alcohol fuels that can be made from many agricultural products such as sugarcanes, corns, and potatoes have been attracting increasing attention. In particular, blended fuels in which alcohol fuel is blended to gasoline have become commercially available recently, and are expected to become more widespread in the future. Note that, although there are various kinds of alcohol fuels such as ethanol and methanol, the following description is provided by taking, as an example, ethanol that is the most popular alcohol fuel.

With wide-spreading of such blended fuels, studies have been also advancing on separators by which a blended fuel fed from outside is again separated into a low octane fuel and a high octane fuel inside a vehicle. Gasoline and ethanol are different from each other in various fuel physical properties such for example as an octane rating and a heat value. For this reason, in some cases, it is more preferable that a blended fuel fed from outside be again separated inside a vehicle rather than being used as it is, and then the low octane fuel and the high octane fuel thus obtained be used selectively or be again mixed and used at a different mixing ratio depending on intended purposes and conditions. The high octane fuel, in particular, is effective to suppress knocking. Thus, in a high load range, injection of a larger volume of the high octane fuel than in a low load range enables suppression of knocking.

Japanese Unexamined Patent Application Publication No. 2006-17077 describes a multi-fuel supply internal combustion engine configured to separate a fuel in a fuel tank by use of a separator to thereby produce a low octane fuel and a high octane fuel, and to supply a combustion chamber with the two kinds of fuels with different properties at a ratio depending on operation conditions, and discloses a technique of estimating the octane ratings of these two fuels. In the disclosure in Patent Document 1, an operation mode of injecting only the low octane fuel and an operation mode of injecting only the high octane fuel are provided, and the octane ratings of the low octane fuel and the high octane fuel are estimated by performing air-fuel ratio control in the respective operation modes.

SUMMARY

According to one aspect of the present invention, a method of estimating antiknock properties of a multi-fuel injection internal combustion engine that injects a low octane fuel (for example, a first fuel to be described later) on a low load side, and injects both of the low octane fuel and a high octane fuel (for example, a second fuel to be described later) on a high load side is provided. The method includes a first estimation step (for example, first learning processing in S5 of FIG. 6 to be described later) of acquiring values of antiknock property-correlated parameters while only the low octane fuel is injected in a first load range (for example, a low octane rating determination range to be described later) (examples of the parameters are an ignition timing, an engine load, an engine revolution speed, an effective compression ratio, and the like at a time point when knocking is detected), and estimating antiknock properties of the low octane fuel (for example, an octane rating, an ethanol concentration, and the like), and a second estimation step (for example, second learning processing in S7 of FIG. 6 to be described later) of acquiring values of the antiknock property-correlated parameters while the low octane fuel and the high octane fuel are injected in a second load range (for example, a high octane rating determination range to be described later) which is on a load side higher than the first load range, and estimating the antiknock properties of the high octane fuel by using the acquired values and the antiknock properties of the low octane fuel estimated in the first estimation step.

According to another aspect of the present invention, a method of estimating antiknock properties of a multi-fuel injection internal combustion engine includes: acquiring a first antiknock property-correlated parameter value while only a first fuel having a low octane rating is injected in a first load range; estimating a first antiknock property of the first fuel based on the first antiknock property-correlated parameter value; acquiring a second antiknock property-correlated parameter value while the first fuel and a second fuel which has a high octane rating higher than the low octane rating are injected in a second load range higher than the first load range; and estimating a second antiknock property of the second fuel based on the second antiknock property-correlated parameter value and the first antiknock property of the first fuel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
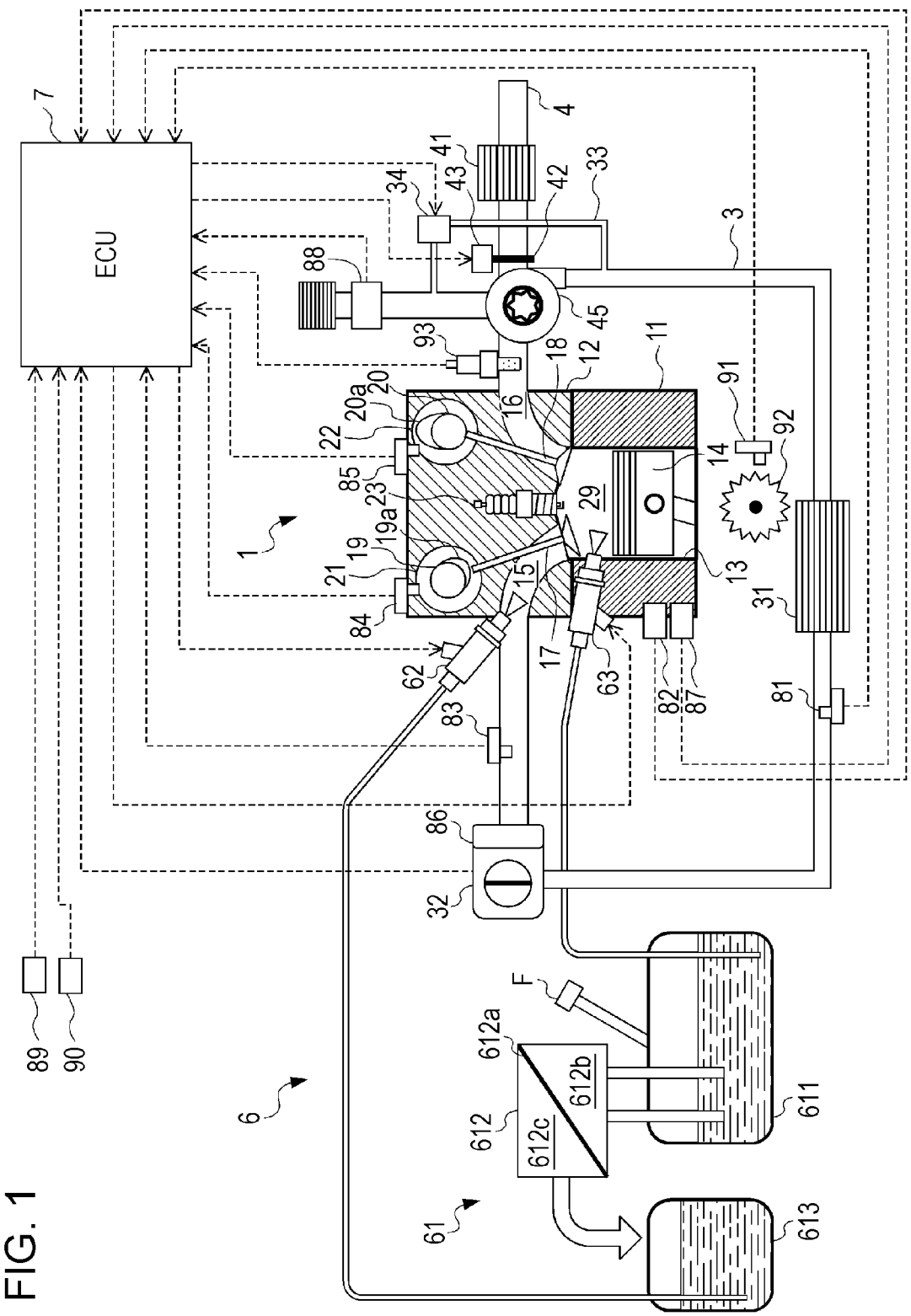
FIG. 1 is a diagram illustrating a configuration of an engine and a control device thereof to which a method of estimating antiknock properties according to a first embodiment of the present disclosure is applied.

The embodiments will now be described with reference to the accompanying drawings, wherein like reference numerals designate corresponding or identical elements throughout the various drawings.

First Embodiment

Hereinafter, a first embodiment of the present disclosure is described with reference to the drawings.

FIG. 1 is a diagram illustrating a configuration of a multi-fuel injection type internal combustion engine (simply referred to as "engine" below) 1 and a control device thereof to which a method of estimating antiknock properties according to this embodiment is applied.

The engine 1 includes an intake pipe 3 through which intake air flows, an exhaust pipe 4 through which exhaust air flows, a turbocharger 45 to compress the intake air in the intake pipe 3 and feed the compressed air to the engine 1, a fuel supply system 6 to supply a fuel to the engine 1 or an intake port 15 of the engine 1, and an electronic control unit (abbreviated as "ECU" below) 7 to control these components.

The engine 1 is a multi-cylinder engine including multiple cylinders 13. FIG. 1 illustrates a representative one of the cylinders 13. The engine 1 is configured such that a cylinder block 11 in which the cylinders 13 are formed is assembled with a cylinder head 12. A piston 14 is provided to be slidable inside each of the cylinders 13. A combustion chamber 29 of the engine 1 is formed of top faces of the pistons 14 and a cylinder 13 side face of the cylinder head 12. Each piston 14 is coupled to a crankshaft not illustrated via a connecting rod. In other words, the crankshaft (not illustrated) is rotated with reciprocations of the pistons 14 inside the cylinders 13.

The cylinder head 12 is provided with the intake port 15 connecting the combustion chamber 29 and the intake pipe 3, and an exhaust port 16 connecting the combustion chamber 29 and the exhaust pipe 4. An intake opening of the intake port 15 facing the combustion chamber 29 is opened and closed by an intake valve 17. An exhaust opening of the exhaust port 16 facing the combustion chamber 29 is opened and closed by an exhaust valve 18.

The cylinder head 12 is provided with an ignition plug 23 facing the inside of the combustion chamber 29, an intake camshaft 19 to drive the intake valve 17 for opening and closing, and an exhaust camshaft 20 to drive the exhaust valve 18 for opening and closing. The ignition plug 23 is connected to the ECU 7 via an ignitor and its driver, which are not illustrated. The ignition timing of the ignition plug 23 is controlled by fuel-injection and ignition control to be described later.

The intake camshaft 19 is provided with multiple intake cams 19a to drive the intake valve 17 for opening and closing. Meanwhile, the exhaust camshaft 20 is also provided with multiple exhaust cams 20a to drive the exhaust valve 18 for opening and closing. Here, FIG. 1 illustrates only one of the cams 19a and one of the cams 20a. These camshafts 19, 20 are each coupled to the crankshaft via a not-illustrated linkage mechanism including a sprocket, a timing chain and others, and are driven to rotate by the crankshaft. More specifically, the camshafts 19, 20 each make one rotation for every two rotations of the crankshaft. When the camshafts 19, 20 rotate, the valves 17, 18 move back and forth according to the profiles of the cams 19a, 20a.

One end of the intake camshaft 19 is provided with a cam phase varying mechanism (variable timing control: VTC) 21 to change the cam phase of the intake cams 19a relative to the crankshaft. The intake-side VTC 21 is capable of advancing and retarding opening and closing timings of the intake valve 17 (that is, an intake valve opening (IVO) and an intake valve closing (IVC)) by advancing or retarding the cam phase angle of the intake camshaft 19 steplessly. This embodiment achieves an operation in the Atkinson cycle (Miller cycle) in which an effective compression ratio of the combustion chamber 29 of the engine 1 can be controlled variably by use of such intake-side VTC 21. Specifically, the intake air volume is reduced by correcting the closing timing of the intake valve 17 to an advance or retard side with respect to the bottom dead center, so that the effective compression ratio can be reduced.

Meanwhile, one end of the exhaust camshaft 20 is also provided with a VTC 22 to change the cam phase of the exhaust cams 20a relative to the crankshaft, and thereby to advance and retard opening and closing timings of the exhaust valve 18 (that is, an exhaust valve opening (EVO) and an exhaust valve closing (EVC)). In this embodiment, the exhaust-side VTC 22 advances or retards the closing timing of the exhaust valve 18, and thereby variably controls a valve overlap period between the opening timing of the intake valve 17 and the closing timing of the exhaust valve 18.

The turbocharger 45 includes a turbine (not illustrated) provided to the exhaust pipe 4, and a compressor (not illustrated) provided to the intake pipe 3. The turbine is driven by kinetic energy of the exhaust air flowing through the exhaust pipe 4. The compressor is driven and rotated by the turbine to compress the intake air inside the intake pipe 3 and to feed the compressed air to the engine 1.

The intake pipe 3 is provided with the compressor of the turbocharger 45, an intercooler 31, and a throttle valve 32, which are disposed in this order from the upstream side to the downstream side. The intercooler 31 cools the intake air compressed by the turbocharger 45, and thereby improves an intake air charging efficiency of the engine 1. The throttle valve 32 controls a flow rate of air to be supplied to the combustion chamber 29 of the engine 1 (referred to as "intake flow rate" below). The throttle valve 32 is connected to the ECU 7 via a driver not illustrated. More specifically, this throttle valve 32 is what is termed as a drive-by-wire (DBW) throttle which is not mechanically connected to an accelerator pedal (not illustrated) to be operated by a driver. The throttle valve 32 is controlled at an appropriate opened position by intake air volume control to be described later.

In addition, the intake pipe 3 is provided with a bypass passage 33 through which upstream and downstream sides of the compressor of the turbocharger 45 communicate with each other, and a blowoff valve 34 to open and close the bypass passage 33. When the blowoff valve 34 is opened, the upstream and downstream sides of the compressor of the turbocharger 45 communicate with each other, and pressure between the compressor and the throttle valve 32 (hereinafter referred to as "boost pressure") is released. The blowoff valve 34 is connected to the ECU 7 via a driver not illustrated. The blowoff valve 34 is opened and closed at appropriate timings by the intake air volume control to be described later.

The exhaust pipe 4 is provided with the turbine of the turbocharger 45 and an exhaust emission control catalyst 41, which are disposed in this order from the upstream side to the downstream side. The exhaust emission control catalyst 41 cleans exhaust gases, and is a three way catalytic converter, for example, to clean the exhaust gases by reducing HC, CO, NOx or others.

In addition, the exhaust pipe 4 is also provided with a bypass passage 42 through which upstream and downstream sides of the turbine of the turbocharger 45 communicate with each other, and a wastegate valve 43 to open and close the bypass passage 42. When the wastegate valve 43 is opened, the upstream and downstream sides of the turbine of the turbocharger 45 communicate with each other, so that the number of revolutions of the turbine is regulated and therefore the boost pressure is also regulated. The wastegate valve 43 is connected to the ECU 7 via a driver not illustrated. The wastegate valve 43 is opened and closed at appropriate timings by the intake air volume control to be described later.

The fuel supply system 6 includes a fuel storage 61 to store a fuel, a port injector 62 to inject the fuel stored in the fuel storage 61 to the intake air of the engine 1, and a direct injector 63 to directly inject the fuel stored in the fuel storage 61 to the inside of the combustion chamber 29.

The fuel storage 61 includes a main tank 611 into which a blended fuel of ethanol and gasoline fed from a fuel feed port F is introduced, a separator 612 to separate the blended fuel inside the main tank 611, and a sub-tank 613 to store the fuel separated by the separator 612. The separator 612 separates the ethanol and aromatic compounds from the blended fuel stored in the main tank 611, and supplies the separated ethanol and aromatic compounds to the sub-tank 613.

The separator 612 separates the blended fuel stored in the main tank 611 into a first fuel and a second fuel by pervaporation, for example. Here, the second fuel has a higher ethanol concentration than the blended fuel (i.e., the second fuel is a high octane fuel), whereas the first fuel has a lower ethanol concentration than the blended fuel or the second fuel (i.e., the first fuel is a low octane fuel). The separator 612 supplies the second fuel separated from the blended fuel to the sub-tank 613 and returns the remaining first fuel to the main tank 611.

To be more specific, the separator 612 includes a separation film 612a to selectively allow particular components in the blended fuel to pass through the separation film 612a, and includes a high pressure chamber 612b and a low pressure chamber 612c which are partitioned by the separation film 612a. In this separator 612, the fuel stored in the main tank 611 is circulated to the high pressure chamber 612b, and the pressure inside the low pressure chamber 612c is reduced by a pump not illustrated. Then, part of the blended fuel circulating inside the high pressure chamber 612b evaporates, flows into the low pressure chamber 612c through the separation film 612a, and thereafter is supplied to the sub-tank 613. In this way, the sub-tank 613 stores the second fuel mainly containing ethanol and aromatic compounds, and having a higher octane rating than the initial blended fuel fed from the outside. The main tank 611 stores the first fuel mainly containing gasoline and having a lower octane rating than the initial blended fuel fed from the outside or the second fuel.

The direct injector 63 is supplied with the first fuel stored in the main tank 611 via a fuel pump not illustrated, and directly injects the supplied first fuel to the inside of the combustion chamber 29 of the engine 1. The direct injector 63 is connected to the ECU 7 via a driver not illustrated. Thus, the ECU 7 controls a valve opening timing and a valve open duration of the direct injector 63, that is, an injection timing and an injection duration (i.e., an injection volume per stroke) for injecting the first fuel into the inside of the combustion chamber 29.

The port injector 62 is supplied with the second fuel stored in the sub-tank 613 via a fuel pump not illustrated, and injects the supplied second fuel to the inside of the intake port 15. The port injector 62 is connected to the ECU 7 via a driver not illustrated. Thus, the ECU 7 controls a valve opening timing and a valve open duration of the port injector 62, that is, an injection timing and an injection duration (i.e., an injection volume per stroke) for injecting the second fuel into the inside of the intake port 15.

The ECU 7 is an electronic control unit to control various components provided in the engine 1, and includes electronic circuits such as a CPU, a ROM, a RAM, and various interfaces. Multiple sensors 81 to 93 are connected to the ECU 7 in order that the ECU 7 can recognize conditions of the engine 1, conditions of a vehicle on which the engine 1 is mounted, and other things.

A boost pressure sensor 81 outputs to the ECU 7 a detection signal approximately proportional to the boost pressure on the downstream side of the turbocharger 45 in the intake pipe 3, more specifically, between the intercooler 31 and the throttle valve 32 in the intake pipe 3. A water temperature sensor 82 outputs to the ECU 7 a detection signal approximately proportional to the temperature of a cooling water flowing inside a coolant passage (not illustrated) in the cylinder block 11 of the engine 1 (simply referred to as "water temperature" below). Here, by way of a non-limiting example, the ECU 7 uses the water temperature detected by the water temperature sensor 82 as a representative temperature of the engine 1.

An intake air sensor 83 is a sensor to detect conditions of intake air on the downstream side of the throttle valve 32 in the intake pipe 3. More specifically, the intake air sensor 83 includes an intake air temperature sensor to output to the ECU 7 a detection signal approximately proportional to the temperature of intake air at a target location (hereinafter referred to as "intake air temperature"), an intake air pressure sensor to output to the to the ECU 7 a detection signal approximately proportional to the pressure of intake air at a target location (hereinafter referred to as "intake air pressure"), and the like.

An intake-side cam sensor 84 outputs a pulse signal to the ECU 7 every time the intake camshaft 19 rotates by a predetermined cam angle. An exhaust-side cam sensor 85 outputs a pulse signal to the ECU 7 every time the exhaust camshaft 20 rotates by a predetermined cam angle. The ECU 7 recognizes the actual cam phases of the camshafts 19, 20 based on the pulse signals transmitted from the cam sensors 84, 85.

A throttle opening sensor 86 outputs to the ECU 7 a detection signal approximately proportional to the position of the throttle valve 32 (hereinafter referred to as "throttle position").

A knocking sensor 87 outputs to the ECU 7 a detection signal depending on vibration of the engine 1 caused by knocking. The ECU 7 determines whether knocking occurs or not based on the output from the knocking sensor 87.

An air flow meter 88 outputs to the ECU 7 a detection signal approximately proportional to the flow rate of intake air on the upstream side of the compressor of the turbocharger 45 in the intake pipe 3.

An accelerator pedal sensor 89 detects the position of the accelerator pedal operated and pressed by the driver, and outputs a detection signal depending on the detected position to the ECU 7.

A vehicle speed sensor 90 outputs to the ECU 7 pulse signals proportional to the speed of the vehicle. The ECU 7 calculates the vehicle speed by not-illustrated processing based on the pulse signals received from the vehicle speed sensor 90.

A crank angle sensor 91 outputs a pulse signal to the ECU 7 every time a pulser 92 fixed to the crankshaft rotates by a predetermined crank angle. The ECU 7 recognizes an actual engine revolution speed based on the output of the crank angle sensor 91.

An air-fuel ratio sensor 93 is provided upstream of the exhaust emission control catalyst 41 in the exhaust pipe 4, and outputs to the ECU 7 a detection signal approximately proportional to an oxide concentration in the exhaust gases (air-fuel ratio). The following description is provided for a case where a sensor having a linear output characteristic approximately proportional to the air-fuel ratio at a detection location is used as the air-fuel ratio sensor 93, but the present disclosure is not limited to this case.

Figure 2:
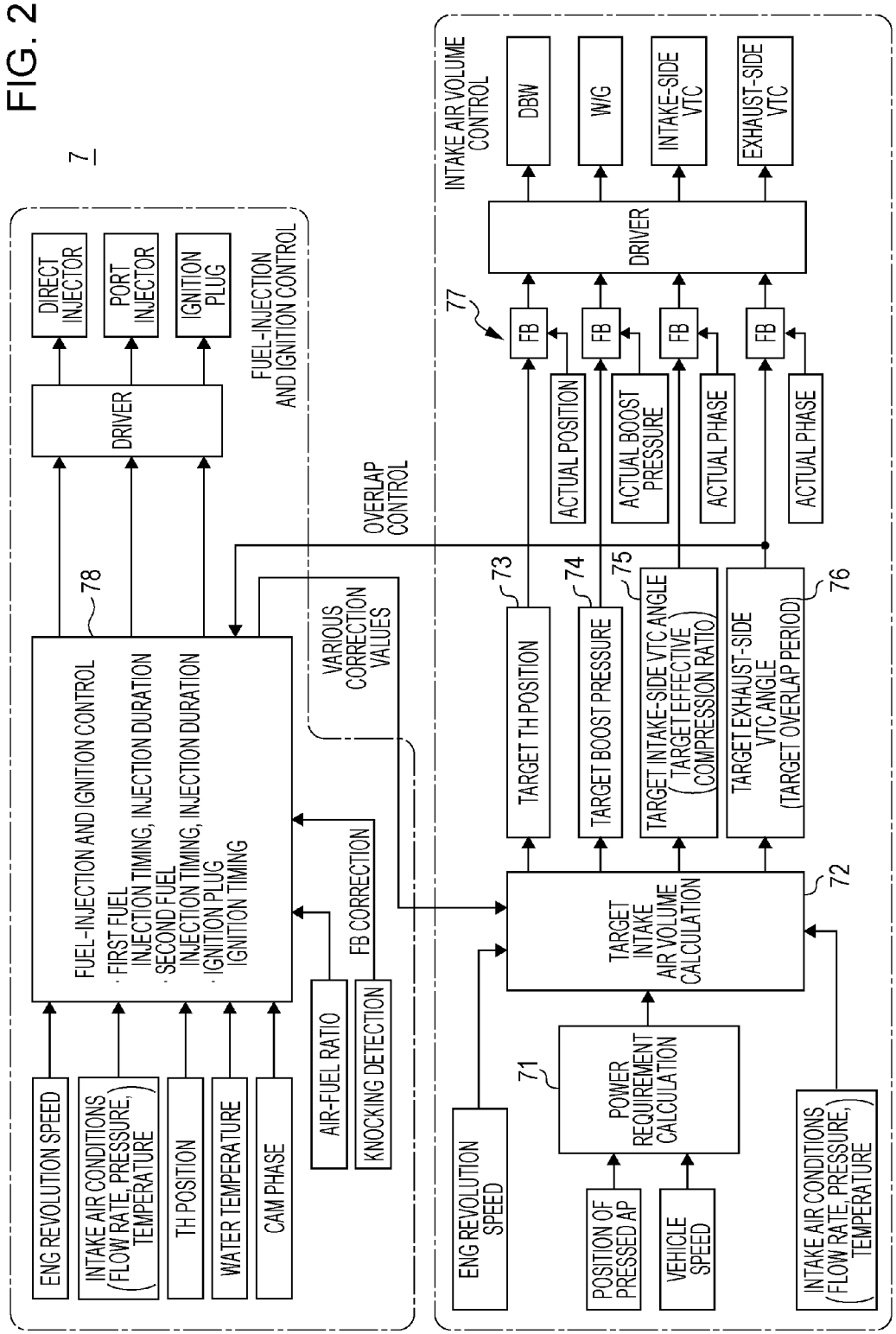
FIG. 2 is a block diagram illustrating procedures of intake air volume control and fuel-injection and ignition control.
Figure 3:
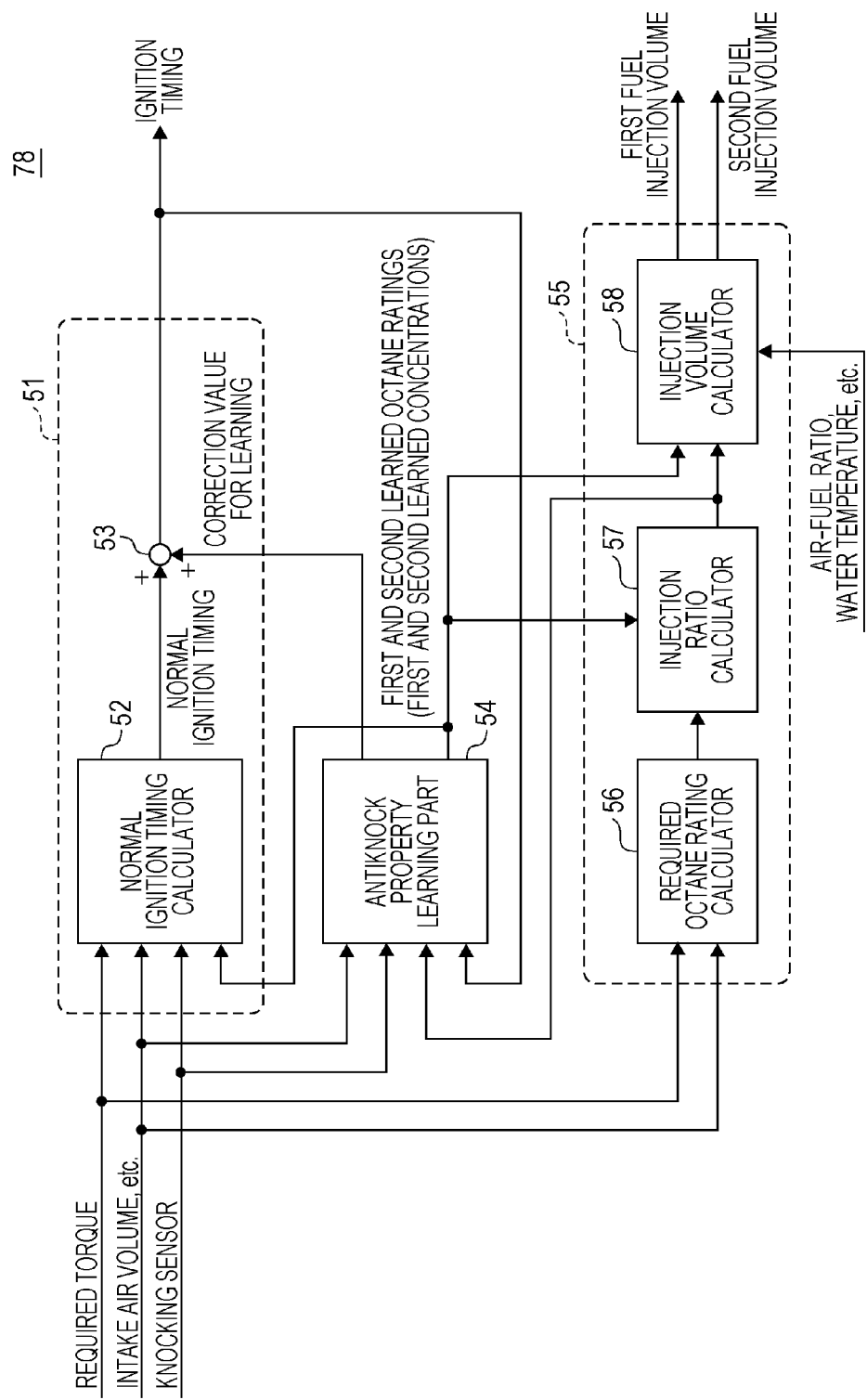
FIG. 3 is a block diagram illustrating a procedure for a fuel-injection and ignition controller to determine injection conditions and ignition conditions.

Next, with reference to FIGS. 2 and 3, description is provided for procedures of intake air volume control and fuel-injection and ignition control executed mainly by the ECU 7.

FIG. 2 is a block diagram illustrating procedures of intake air volume control and fuel-injection and ignition control. It should be noted that three operation modes are defined in the intake air volume control and the fuel-injection and ignition control described below. The three operation modes include a normal operation mode that is the most basic one and is executed in a normal operation, and include a first fuel learning mode (for example, see S23 in FIG. 7 to be described later) and a second learning mode (for example, see S33 in FIG. 10 to be described later) that are executed only in learning antiknock properties of the fuels. In the following description, functions not particularly specified are those which can be implemented only in the normal operation mode or are common to the three operation modes.

The intake air volume control is implemented by a combination of functions of a power requirement calculator 71, a target intake air volume calculator 72, a target throttle position calculator 73, a target boost pressure calculator 74, a target intake-side VTC angle calculator 75, a target exhaust-side VTC angle calculator 76, a feedback controller 77, and the like. The functions of these modules are described in turn below.

The power requirement calculator 71 determines a power requirement to be fulfilled by the engine by searching a predetermined map on the basis of the engine revolution speed, the position of the pressed accelerator pedal, the vehicle speed, and the like. The target intake air volume calculator 72 determines a target intake air volume which is a target volume of intake air to be supplied to the engine by searching a predetermined map on the basis of the engine revolution speed, the power requirement, the intake flow rate, the intake air pressure, the intake air temperature, a fuel injection volume that is determined in the fuel-injection and ignition control, and the like. The target throttle position calculator 73 determines a target throttle position that is a target position of the throttle valve by searching a predetermined map on the basis of the target intake air volume, the engine revolution speed, and the like. The target boost pressure calculator 74 determines a target boost pressure that is a target of the boost pressure by searching a predetermined map on the basis of the target intake air volume, the engine revolution speed, and the like.

The target intake-side VTC angle calculator 75 determines a target effective compression ratio that is a target of the effective compression ratio by searching a predetermined standard map on the basis of the target intake air volume, the engine revolution speed, and the like, and determines a target intake-side cam phase that is a target of the cam phase of the intake camshaft to achieve this target effective compression ratio. In this standard map, in order to prevent knocking from occurring in an entire load range covering the low load to the high load, the target effective compression ratio changes from a high ratio to a low ratio as the load changes from a high load side to a low load side. With this setting, the engine can be operated using Otto cycle on the high load side, whereas being operated using Atkinson cycle on the low load side.

Note that, in execution of the first fuel learning mode defined in a second embodiment to be described later, the target intake-side VTC angle calculator 75 corrects the effective compression ratio determined by searching the aforementioned standard map to a higher ratio, and determines the higher ratio as the target effective compression ratio. Thus, the target intake-side VTC angle calculator 75 temporarily imposes conditions likely to cause knocking.

The target exhaust-side VTC angle calculator 76 determines a target overlap period that is a target of the valve overlap period by searching a predetermined map on the basis of the target intake air volume, the engine revolution speed, and the like, and determines a target exhaust-side cam phase that is a target of the cam phase of the exhaust camshaft to achieve this target overlap period.

The feedback controller 77 determines control inputs to be provided to the throttle valve, the wastegate valve, the intake-side VTC, and the exhaust-side VTC on the basis of a certain known feedback algorithm such as to eliminate deviations of the actual throttle position, the actual boost pressure, the actual intake-side cam phase, and the actual exhaust-side cam phase from their respective target values set as described above. Then, the feedback controller 77 inputs the determined control inputs to their drivers.

The fuel-injection and ignition control is implemented by a fuel-injection and ignition controller 78. In accordance with procedures to be described with reference to FIG. 3 and following drawings, the fuel-injection and ignition controller 78 determines an injection volume and an injection timing to inject the second fuel from the port injector, an injection volume and an injection timing to inject the first fuel from the direct injector, and an ignition timing of the ignition plug, determines control inputs to be provided to the port injector, the direct injector, and the ignition plug such as to achieve the determined injection conditions and ignition conditions, and inputs the determined control inputs to their respective drivers.

FIG. 3 is a block diagram illustrating a procedure for the fuel-injection and ignition controller 78 to determine the injection conditions and the ignition conditions.

The fuel-injection and ignition controller 78 includes an ignition timing determination part 51 to determine the ignition timing, an antiknock property learning part 54 to learn the antiknock properties (an ethanol concentration, an octane rating and the like) of the first and second fuels, and a fuel injection volume determination part 55 to determine the injection volumes of the first and second fuels.

The antiknock property learning part 54 estimates and learns the antiknock properties (more specifically, the octane rating, the ethanol concentration, and the like) of the first fuel and the second fuel currently used, by performing learning processing using inputs such as the intake air volume, the detection signal of the knocking sensor, the ignition timing, and an injection ratio to be described later. In the following description, the octane rating of the first fuel obtained by the antiknock property learning part 54 is referred to as a first learned octane rating. Then, the octane rating of the second fuel obtained by the antiknock property learning part 54 is referred to as a second learned octane rating. Meanwhile, the ethanol concentration of the first fuel derived when necessary from the first learned octane rating in accordance with a known transformation law is referred to as a first learned concentration below. Then, the ethanol concentration of the second fuel derived from the second learned octane rating in the same manner is referred to as a second learned concentration below.

Figure 4:
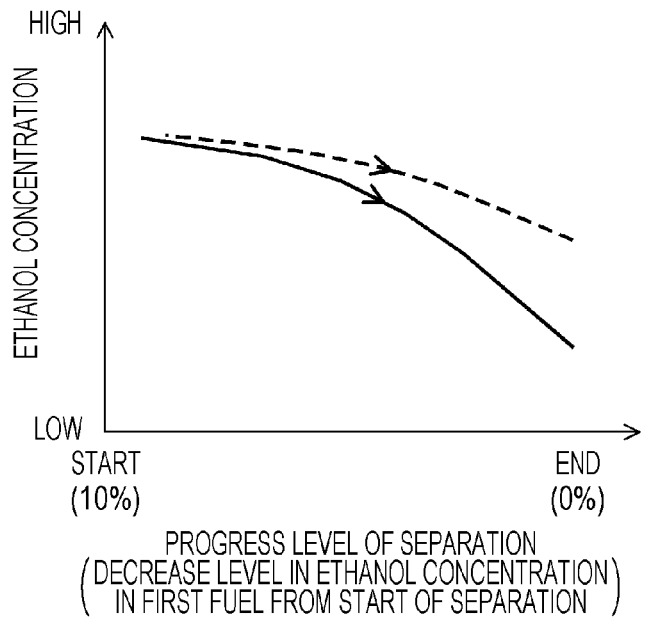
FIG. 4 is a diagram presenting temporal changes in ethanol concentrations in first and second fuels.

FIG. 4 is a diagram presenting temporal changes in the ethanol concentrations in the first and second fuels. In FIG. 4, the horizontal axis indicates a progress level of separation (in other words, a decrease level in the ethanol concentration of the first fuel in the main tank after the start of separation), and the vertical axis indicates the ethanol concentration. In FIG. 4, the solid line indicates the ethanol concentration (instantaneous value) of the fuel exiting from the separator, and the broken line indicates the ethanol concentration (average value) of the second fuel in the sub-tank. FIG. 4 illustrates a case of fuel feeding with a blended fuel having an ethanol concentration of 10%.

The blended fuel fed from the outside is once stored in the main tank. Then, the first fuel in the main tank is circulated in the separator, whereby the second fuel having a high octane rating is separated and then is stored in the sub-tank. Accordingly, with the progress of the separation, the ethanol concentration in the first fuel in the main tank gradually decreases from 10%, which is the concentration immediately after the fuel feeding. In this process, since the ethanol concentration in the main tank decreases, the ethanol concentration in the fuel supplied to the separator decreases. Hence, the ethanol concentration in the fuel separated by the separator also decreases (see the broken line in FIG. 4), and eventually the ethanol concentration in the second fuel in the sub-tank also gradually decreases (see the solid line in FIG. 4).

Here, again by referring to FIG. 3, in order to follow such temporal changes in the antiknock properties of the first and second fuels, the antiknock property learning part 54 successively updates the values of the first and second learned octane ratings in accordance with procedures to be explained later with reference to FIGS. 6 to 10 and others. The first and second learned octane ratings obtained by the antiknock property learning part 54 are transformed to the first and second learned concentrations, when necessary, which are then used by the ignition timing determination part 51, the fuel injection volume determination part 55, and the like. Thus, the suitable ignition timing and injection volume are determined depending on the antiknock properties of the first and second fuels changing over time.

The ignition timing determination part 51 includes a normal ignition timing calculator 52 to calculate the value of the normal ignition timing, and an adder 53 to calculate the final value of the ignition timing by adding a predetermined correction value for learning to the value of the aforementioned normal ignition timing.

The normal ignition timing calculator 52 calculates the value of the normal ignition timing such that an optimum output torque can be obtained without causing knocking in accordance with a known algorithm using inputted values such as the values of the required torque, the intake air volume, the water temperature, the output of the knocking sensor, the injection ratio to be described later, and the first and second learned concentrations successively updated by the antiknock property learning part 54.

Note that the aforementioned correction value for learning is set to 0 during execution of the normal operation mode, and is set to a value other than 0 only during execution of either the first fuel learning mode or the second fuel learning mode, the value other than 0 being calculated by the antiknock property learning part 54. Thus, during the execution of the normal operation mode, the ignition timing determination part 51 determines the aforementioned normal ignition timing as the final ignition timing. Meanwhile, during the execution of the first or second fuel learning mode, the ignition timing determination part 51 corrects the normal ignition timing by using the aforementioned correction value for learning, and determines the corrected ignition timing as the final ignition timing.

The fuel injection volume determination part 55 includes a required octane rating calculator 56 to determine the required octane rating, an injection ratio calculator 57 to determine the injection ratio, and an injection volume calculator 58 to determine the injection volumes of the first and second fuels.

The required octane rating calculator 56 calculates the value of the required octane rating by using, as inputs, parameters correlated to the engine load such as the values of the required torque and the intake air volume. Here, the required octane rating is equivalent to an intra-cylinder octane rating minimum necessary to avoid the occurrence of knocking in the engine. Here, the "intra-cylinder octane rating" is calculated as an octane rating of the total fuel supplied to and combusted in the cylinders of the engine. The required octane rating calculator 56 sets a larger value for the required octane rating as the engine load becomes higher in order to minimize the occurrence of knocking in the entire load range covering the low load to the high load.

The injection ratio calculator 57 searches a predetermined map by using the first and second learned octane ratings updated by the antiknock property learning part 54, and thereby calculates the value of the injection ratio minimum necessary to achieve the aforementioned required octane rating, or in other words to avoid the occurrence of knocking. Here, the injection ratio is defined as a ratio of the second fuel to the total fuel supplied to the cylinders (for example, a volume ratio).

Figure 5:
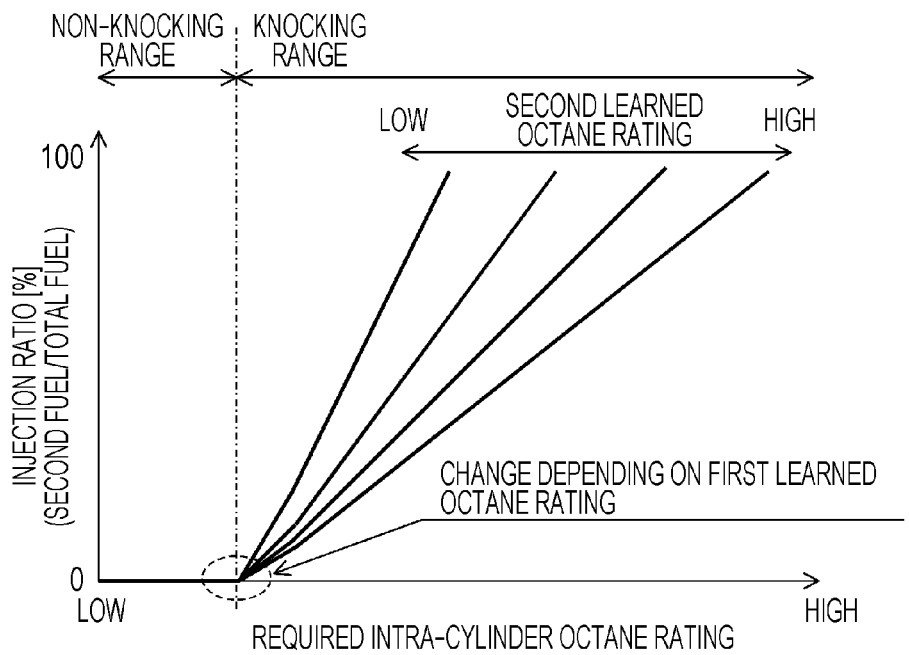
FIG. 5 is an example of a map for determining an injection ratio.

FIG. 5 is an example of a map for determining the injection ratio. In FIG. 5, the horizontal axis is a required octane rating and the vertical axis is an injection ratio. FIG. 5 illustrates the example of the map in which the second learned octane rating is varied to four levels of values, while the first learned octane rating is fixed at a predetermined value. As illustrated in FIG. 5, when the required octane rating is lower than the first learned octane rating, the required octane rating can be achieved only with the injection of the first fuel, and therefore the injection ratio is 0%. In the following description, a non-knocking range is defined as a load range where the injection ratio is 0% when the injection ratio is determined by using the map as illustrated in FIG. 5 such as to avoid the occurrence of knocking while minimizing the consumption of the second fuel.

If the required octane rating becomes higher than the first learned octane rating, the required octane rating cannot be achieved unless the second fuel is also supplied in addition to the first fuel, and therefore the injection ratio increases from 0%. In addition, as illustrated in FIG. 5, as the required octane rating becomes lower or the second learned octane rating becomes higher, the injection ratio becomes lower. In the following description, a knocking range is defined as a load range other than the non-knocking range, more specifically, a load range where the injection ratio is higher than 0% when the injection ratio is determined by using the map as illustrated in FIG. 5.

Again referring to FIG. 3, the injection ratio calculator 57 searches the map as illustrated in FIG. 5 by using the required octane rating, the first and second learned octane ratings, and the like, and thereby calculates the value of the injection ratio such as to achieve the required octane rating while avoiding the occurrence of knocking.

During execution of the first fuel learning mode to be described later, even if the engine load is within the knocking range, the injection ratio calculator 57 forcibly sets the value of the injection ratio to 0% without using the predetermined map as illustrated in FIG. 5, and thereby temporarily imposes the conditions likely to cause knocking.

The injection volume calculator 58 calculates the values of the final injection volumes of the first and second fuels on the basis of the intake air volume, the injection ratio, the first learned concentration, the second learned concentration, the detection value of the air-fuel ratio sensor, the detection value of the temperature sensor, and the like. To be more specific, the injection volume calculator 58 calculates the values of an injection volume GFUEL1 of the first fuel and an injection volume GFUEL2 of the second fuel in accordance with the following formulas (1) and (2):

$$GFUEL1 = GBS1 \times KAF \times KH \quad (1); \text{ and}$$

$$GFUEL2 = GBS2 \times KAF \times KH \quad (2).$$

In the above formulas (1) and (2), GBS1 and GBS2 are basic mass flow rates of the first and second fuels, respectively (each basic mass flow rate being a mass of the corresponding fuel introduced to each cylinder per stroke). The values GBS1 and GBS2 are calculated by using an intra-cylinder intake air volume (a mass of intake air introduced to each cylinder per stroke), the injection ratio, the first learned concentration, and the second learned concentration. More specifically, the injection volume calculator 58 calculates the values of GBS1 and GBS2 such that an air-fuel ratio of a mixture air (a mass ratio of air to fuel) formed of the first and second fuels and the intake air inside the cylinder can become a stoichiometric ratio and the aforementioned injection ratio can be achieved concurrently.

In the above formulas (1) and (2), KH is a temperature correction coefficient, and the value of KH is calculated by searching a predetermined map by use of the intake air temperature, the cooling water temperature, and the like.

Moreover, in the above formulas (1) and (2), KAF is a feedback correction coefficient, and the value of KAF is calculated by using the detection value of the air-fuel ratio sensor provided to the exhaust pipe. The injection volume calculator 58 calculates the value of the feedback correction coefficient KAF in accordance with a known feedback control law such that the detection value of the air-fuel ratio sensor can become a predetermined target value corresponding to the stoichiometric conditions. The value of the correction coefficient KAF is basically 1, but deviates from 1 in a case such as one where an error occurs in the intra-cylinder intake air volume used to determine the basic mass flow rates GBS1 and GBS2 (for example, during a transient operation where the intake air volume varies), or where an error occurs in any of the first and second learned concentrations and the like. Since the basic mass flow rates GBS1 and GBS2 are multiplied by the same correction coefficients KAF and KH as presented in the above formulas (1) and (2), the injection volumes GFUEL1 and GFUEL2 finally obtained can also achieve the aforementioned injection ratio.

Figure 6:
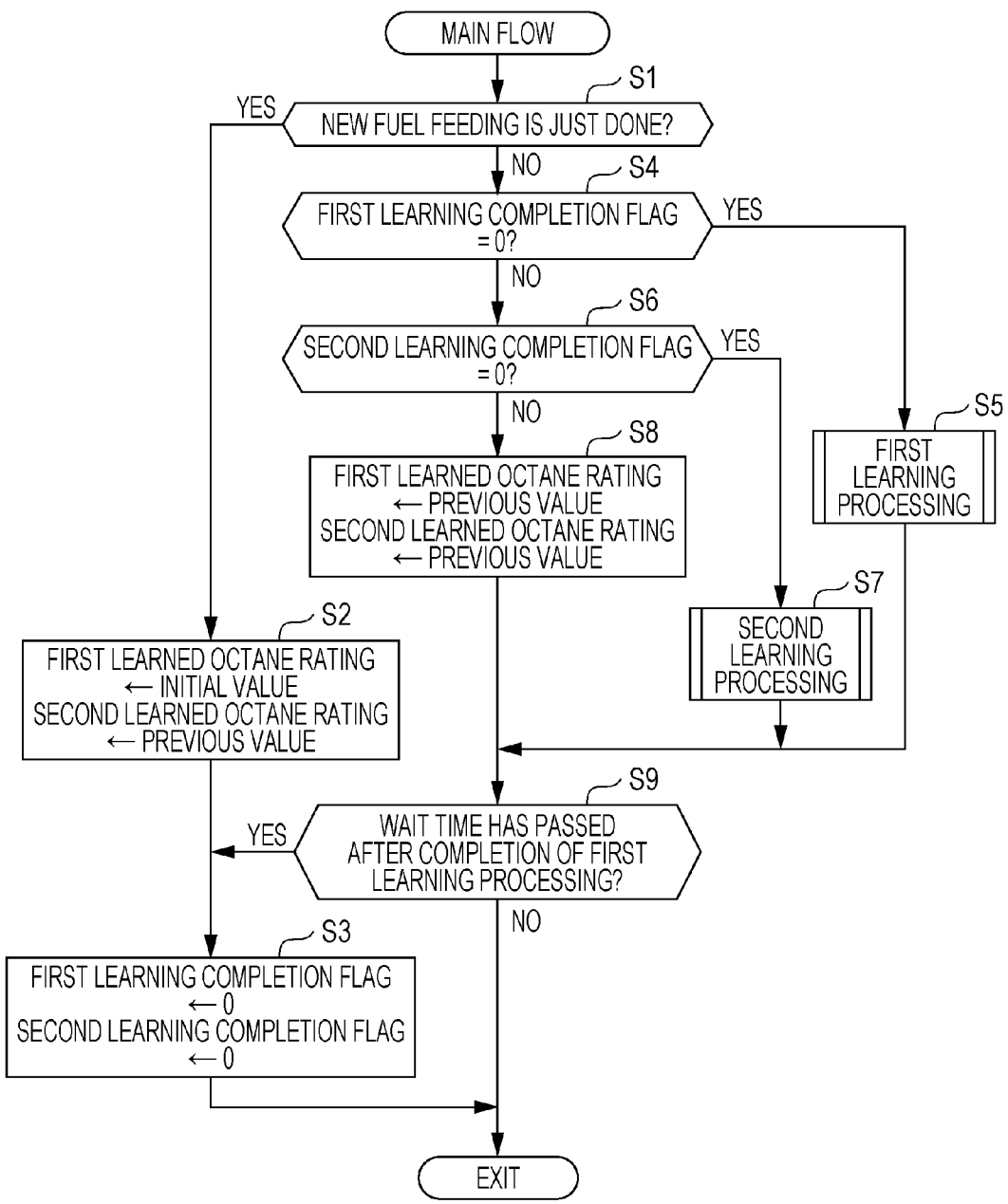
FIG. 6 is a main flowchart of processing of learning octane ratings of first and second fuels.

FIG. 6 is a main flowchart of processing for the aforementioned antiknock property learning part to learn the octane ratings of the first and second fuels. The processing in FIG. 6 is iterated at predetermined time intervals after an ignition switch not illustrated is turned on.

In S1, the antiknock property learning part determines whether or not a new fuel feeding is just done. If the fuel feeding is just done (the determination result of S1 is YES), the antiknock property learning part resets the first learned octane rating to a predetermined initial value while keeping the previous value of the second learned octane rating (see S2). Then, the antiknock property learning part resets both of a first learning completion flag and a second learning completion flag to be described later to 0 (see S3), and terminates the processing in FIG. 6. Since antiknock properties of the blended fuel newly fed are unknown, it is preferable to reset the first learned octane rating to the initial value as in S2 immediately after the fuel feeding. Here, in the system illustrated in FIG. 1, all the blended fuel newly supplied by the fuel feeding is once stored in the main tank. For this reason, it is presumable that the antiknock properties of the second fuel in the sub-tank do not change very much. With this point taken into consideration, in the aforementioned processing in S2, only the first learned octane rating is reset to the initial value, while the second learned octane rating is kept at the previous value. Instead, if the sub-tank is also supplied with a certain fuel in fuel feeding, the second learned octane rating may also be reset to a predetermined initial value as is the case with the first learned octane rating.

Here, the first learning completion flag and the second learning completion flag are flags indicating that the first and second learned octane ratings are updated to the latest values, respectively. These two learning completion flags are reset to 1 in response to updates of the respective learned values in first learning processing (seed S5 and FIG. 7) and second learning processing (see S7 and FIG. 10), which are described later.

If the determination result of S1 is NO, the antiknock property learning part determines whether the first learning completion flag is 0 or not (in other words, whether a predetermined wait time to be described later has passed after the update of the first learned octane rating to the latest value in the first learning processing of S5) (see S4). If the determination result of S4 is YES, the antiknock property learning part executes the first learning processing of updating the first learned octane rating to the latest value (see S5 and FIG. 7 to be described later), and proceeds to S9.

If the determination result of S4 is NO, the antiknock property learning part determines whether the second learning completion flag is 0 or not (in other words, whether the wait time to be described later has passed after the update of the first learned octane rating to the latest value in the first learning processing of S5) (see S6). If the determination result of S6 is YES, the antiknock property learning part executes the second learning processing of updating the second learned octane rating to the latest value (see S7 and FIG. 10 to be described later), and proceeds to S9.

If the determination results of S4 and S6 are both NO, the antiknock property learning part keeps the previous values of the first and second learned octane ratings, and proceeds to S9. In S9, the antiknock property learning part determines whether the predetermined wait time has passed after the change of the first learning completion flag from 0 to 1. If the determination result of S9 is YES, in other words, if the aforementioned wait time has passed after the update of the first learned octane rating to the latest value, the antiknock property learning part resets both of the first learning completion flag and the second learning completion flag to 0 in order to update the first and second learned octane ratings to the latest values (see S3), and then terminates the processing in FIG. 6. On the other hand, if the determination result of S9 is NO, the antiknock property learning part immediately terminates the processing in FIG. 6.

According to the processing in FIG. 6, immediately after fuel feeding, the first learning processing is firstly executed, and then the second learning processing is executed. Then, after the execution of the first and second learning processing once, the first learning processing and the second learning processing are again executed in this order every time a time period corresponding to the aforementioned wait time passes. The reason why the first learning processing is executed first in every iteration as described above is that the second learning processing uses the value of the first learned octane rating to update the value of the second learned octane rating as described below. Specifically, in order to determine the value of the second learned octane rating accurately according to the current antiknock properties of the second fuel, it is more preferable to execute the first learning processing before execution of the second learning processing and to update the first learned octane rating to the latest value.

Figure 7:
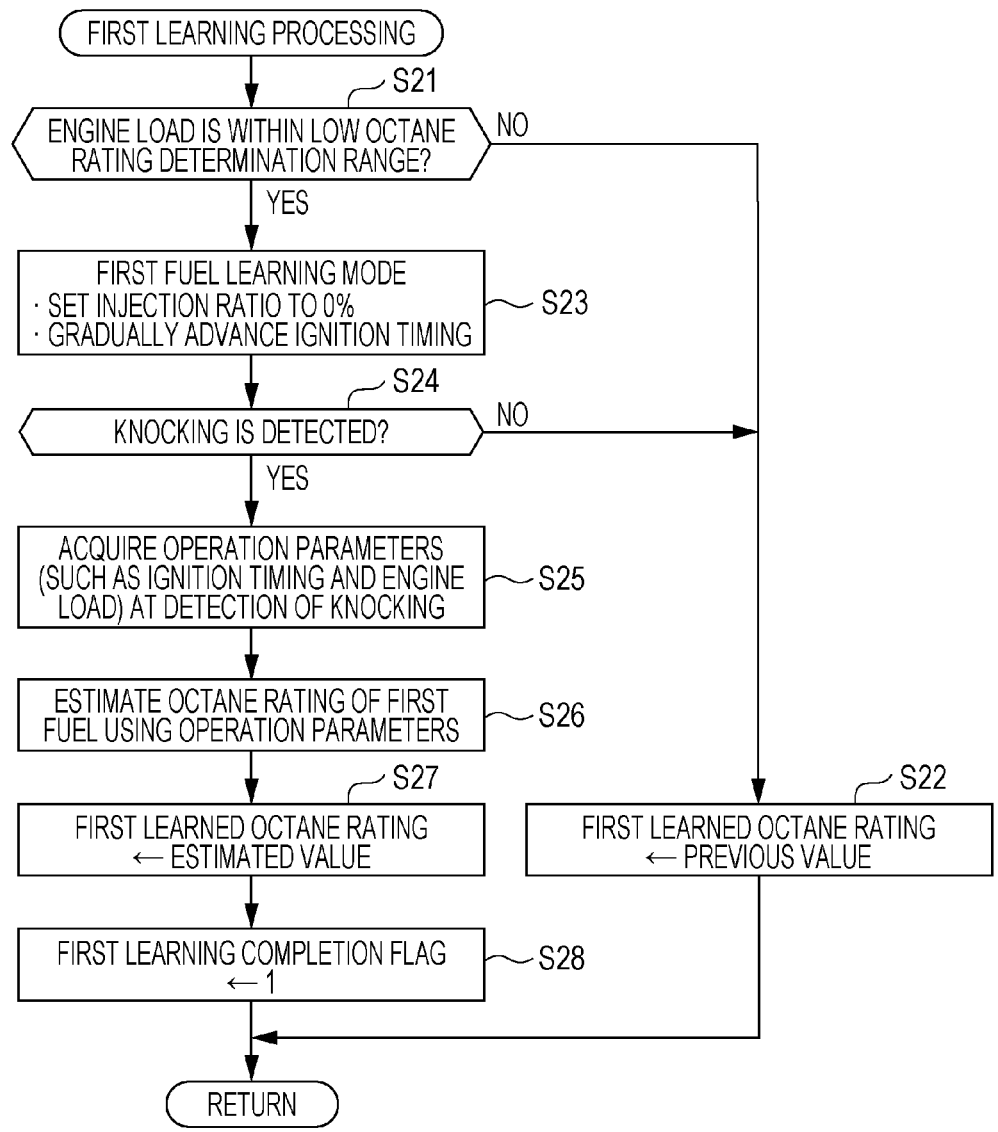
FIG. 7 is a flowchart presenting a procedure of first learning processing.

FIG. 7 is a flowchart presenting a specific procedure of the first learning processing.

In S21, the antiknock property learning part determines whether a current engine load is within a low octane rating determination range specified by predetermined lower and upper limit values. If the determination result of S21 is NO, the antiknock property learning part keeps the previous value of the first learned octane rating (see S22), and immediately terminates the processing in FIG. 7. If the determination result of S21 is YES, the antiknock property learning part executes processing in S23 and following steps in order to update the value of the first learned octane rating.

Here, the low octane rating determination range is described in more details.

Figure 8:
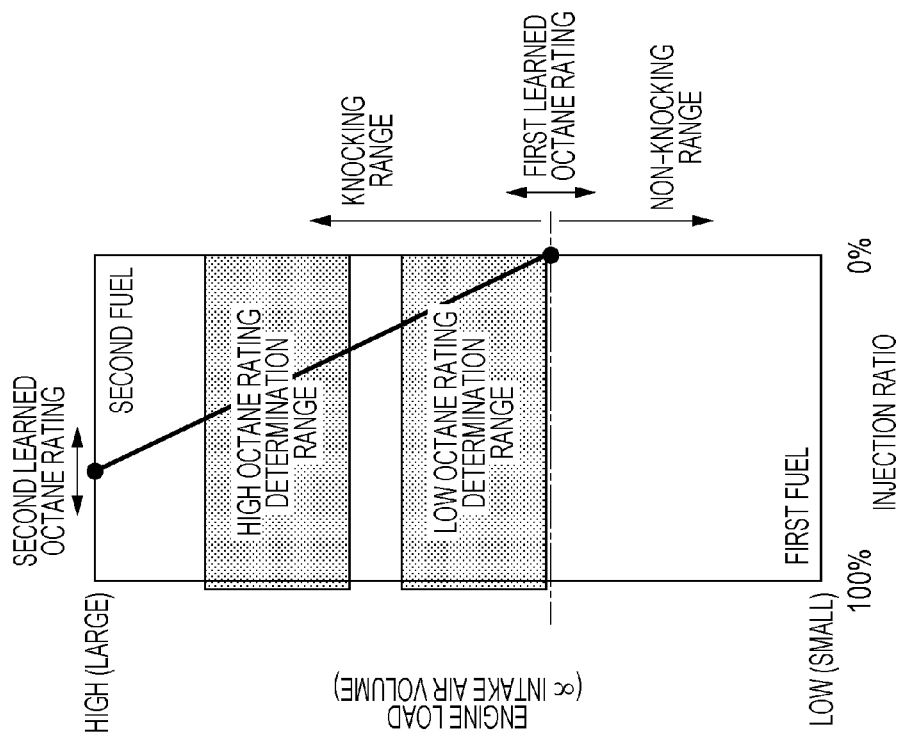
FIG. 8 is a diagram illustrating a relationship between an engine load and an injection ratio.

FIG. 8 is a diagram illustrating a relationship between an engine load (vertical axis) and an injection ratio (horizontal axis) in a case where the fuel injection volumes and the like are controlled in the normal operation mode. As described with reference to FIG. 5, when the fuel injection volumes and the like are controlled in the normal operation mode, the injection ratio set in the non-knocking range is 0% while the injection ratio set in the knocking range becomes higher as the engine load increases in order to avoid the occurrence of knocking in the load range covering the low load to the high load and to minimize the consumption of the second fuel. Here, in the normal operation mode, the injection ratio under the maximum engine load changes depending on the second learned octane rating, and a threshold for dividing the knocking range and the non-knocking range changes depending on the first learned octane rating, as illustrated in FIG. 8.

The aforementioned low octane rating determination range is set within a predetermined width on a low load side in the knocking range as illustrated in FIG. 8. More specifically, the low octane rating determination range is set on the low load side of a range where knocking is likely to occur immediately in the case where the fuel injection volumes and the like are controlled in the normal operation mode, unless the second fuel is injected with the injection ratio set to be higher than 0%, or unless the ignition timing is retarded from the normal ignition timing determined in the normal operation mode.

Again by referring to FIG. 7, in S23, the antiknock property learning part switches the engine operation mode from the normal operation mode to the first fuel learning mode, and proceeds to S24. In this first fuel learning mode, while the engine load is within the low octane rating determination range (within the knocking range), the injection ratio is forcibly set to 0% (in other words, the injection volume of the second fuel is set to 0) to thereby impose the conditions likely to cause knocking. In addition, in the first fuel learning mode, the ignition timing at which the knocking sensor detects knocking for the first time is searched for while the correction value for learning to be added to the value of the normal ignition timing (see FIG. 3) is changed within a predetermined range. More specifically, since the engine with the injection ratio set to 0% is likely to cause knocking, the initial correction value for learning is set to a predetermined value on a timing retard side, and thus the ignition timing is retarded predetermined degrees once from the normal ignition timing. Then, the ignition timing at which the knocking sensor detects knocking is searched for while the correction value for learning is gradually changed to a value on a timing advance side.

In S24, the antiknock property learning part determines whether or not the knocking sensor detects knocking after switching of the engine operation mode to the first fuel learning mode. If the determination result of S24 is NO, the antiknock property learning part proceeds to S22, keeps the previous value of the first learned octane rating, and immediately terminates the processing in FIG. 7. If the determination result of S24 is YES, the antiknock property learning part proceeds to S25, acquires the values of multiple operation parameters specifying the engine operation conditions such as the ignition timing, the engine load, the engine revolution speed, and the effective compression ratio at a time point when the knocking is firstly detected in the first fuel learning mode, and then proceeds to S26.

Figure 9:
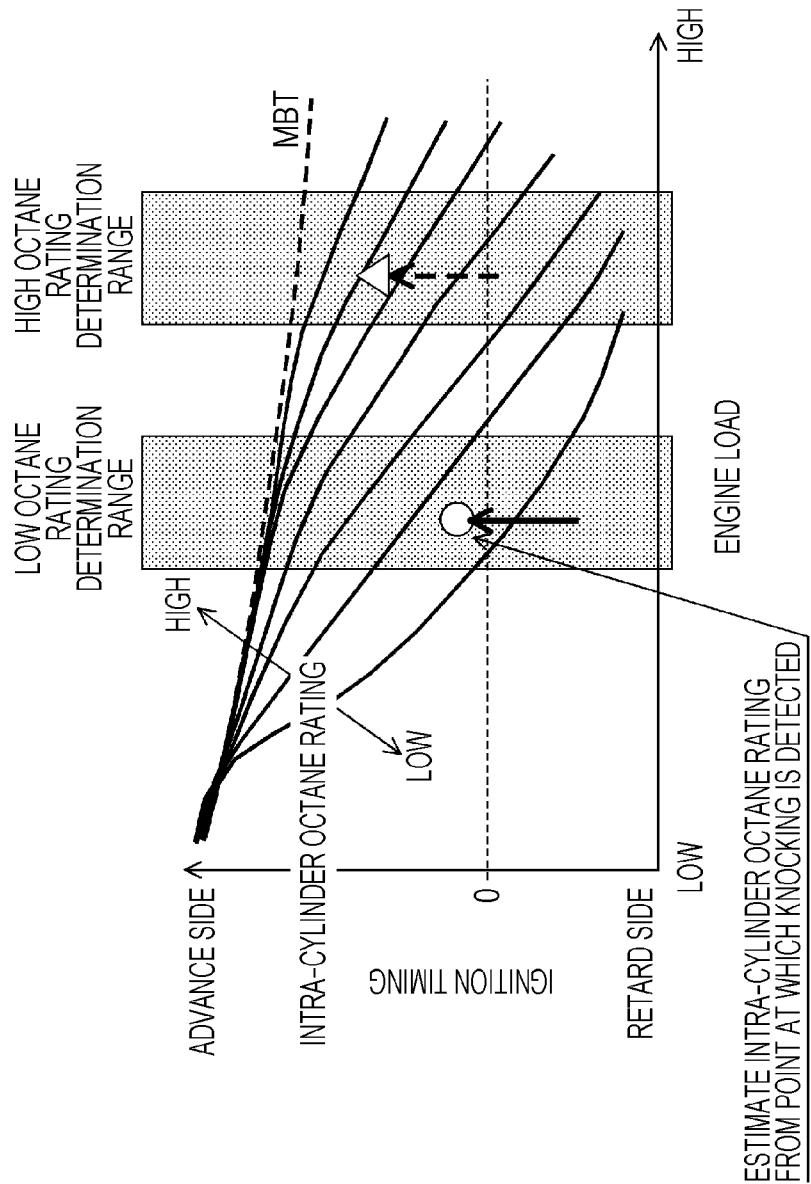
FIG. 9 is a diagram illustrating a relationship between an intra-cylinder octane rating and an ignition timing at occurrence of knocking.

In S26, the antiknock property learning part calculates an estimated value of the octane rating of the first fuel by searching a map as illustrated in FIG. 9 by use of the values of the multiple operation parameters acquired in S25.

FIG. 9 is a diagram illustrating a relationship between an intra-cylinder octane rating (horizontal axis) and an ignition timing (vertical axis) at occurrence of knocking, and is an example of a map to be referred to in S26. FIG. 9 illustrates an example in the case where the values of the other operation parameters such as the engine revolution speed and the effective compression ratio are fixed to predetermined values. The antiknock property learning part includes maps as illustrated in FIG. 9 for respective combinations of values of the engine revolution speed and the effective compression ratio.

In FIG. 9, a broken line is obtained by plotting the ignition timing (what is termed as MBT), at which the engine can generate a maximum torque, at each level of the engine load. As illustrated in FIG. 9, when the engine load is relatively low, the knocking generally occurs on an advance side of the MBT except that a fuel having an extremely low octane rating is used. In contrast, when the engine load increases, the knocking occurs on a retard side of the MBT. The ignition timing at which the knocking occurs is changed to a more retard side as the octane rating of a fuel supplied to the cylinder decreases. In S26, as indicated by a solid arrow in FIG. 9, the intra-cylinder octane rating is estimated by using the ignition timing (see a white circle mark in FIG. 9) at which the first knocking occurs under the conditions where: the engine load is within the low octane rating determination range; the injection ratio is forcibly set to 0%; and the ignition timing is gradually advanced. In addition, since the injection ratio is set to 0% in the first fuel learning mode, the estimated value of the intra-cylinder octane rating obtained from the map in FIG. 9 can be used directly as the estimated value of the octane rating of the first fuel.

Again by referring to FIG. 7, in S27, the antiknock property learning part updates the first learned octane rating to the latest value, that is, the estimated value of the octane rating of the first fuel calculated in S26, and then proceeds to S28. In S28, the antiknock property learning part changes the first learning completion flag from 0 to 1 to explicitly indicate that the first learned octane rating is updated to the latest value in the first learning processing, and terminates the processing in FIG. 7. After the first learning completion flag is changed to 1 in S28, the first learned octane rating is not updated until a new fuel is fed or the foregoing wait time passes.

Figure 10:
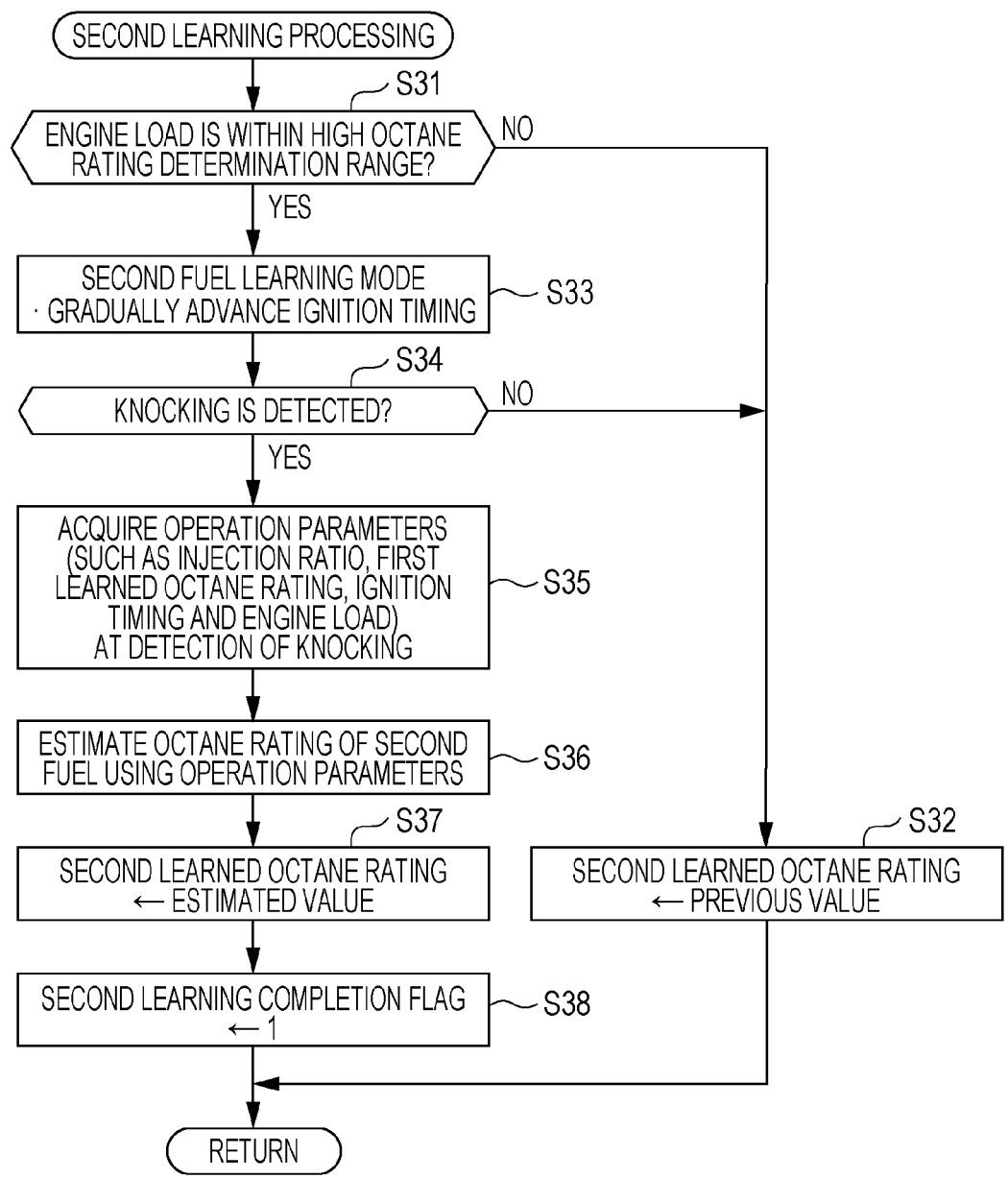
FIG. 10 is a flowchart presenting a procedure of second learning processing.

FIG. 10 is a flowchart presenting a specific procedure of the second learning processing.

In S31, the antiknock property learning part determines whether or not a current engine load is within a high octane rating determination range specified by predetermined lower and upper limit values. If the determination result of S31 is NO, the antiknock property learning part keeps the previous value of the second learned octane rating (see S32), and immediately terminates the processing in FIG. 10. If the determination result of S31 is YES, the antiknock property learning part executes processing in S33 and following steps in order to update the second learned octane rating. This high octane rating determination range is set within a predetermined width in the knocking range on a load side higher than the aforementioned low octane rating determination range as illustrated in FIG. 8. Note that, in order to estimate the second learned octane rating with high accuracy, the better the higher injection ratio, i.e., the better the larger injection volume of the second fuel in the second learning processing, as described below. For this reason, the high octane rating determination range is set on the load side sufficiently higher than the low octane rating determination range.

In S33, the antiknock property learning part switches the engine operation mode from the normal operation mode to the second fuel learning mode, and proceeds to S34. In the second fuel learning mode, while the engine load is within the high octane rating determination range, the ignition timing at which the knocking sensor detects knocking for the first time is searched for by changing, within a predetermined range, the correction value for learning to be added to the value of the normal ignition timing (see FIG. 3). More specifically, in the second fuel learning mode, the correction value for learning is gradually changed to the timing advance side, and thereby the ignition timing is gradually advanced from the normal ignition timing. Here, unlike the aforementioned first fuel learning mode, this second fuel learning mode imposes the conditions likely to cause knocking, by only advancing the ignition timing further from the normal ignition timing while keeping the injection ratio at the ratio determined in the normal operation mode.

In S34, the antiknock property learning part determines whether the knocking sensor detects knocking after switching of the engine operation mode to the second fuel learning mode. If the determination result of S34 is NO, the antiknock property learning part proceeds to S32, keeps the previous value of the second learned octane rating, and immediately terminates the processing in FIG. 10. If the determination result of S34 is YES, the antiknock property learning part proceeds to S35, acquires the values of multiple operation parameters specifying engine operation conditions, such as the injection ratio, the first learned octane rating, the ignition timing, the engine load, the engine revolution speed, and the effective compression ratio, at a time point when the knocking is firstly detected in the second fuel learning mode, and then proceeds to S36.

In S36, the antiknock property learning part calculates an estimated value of the octane rating of the second fuel by searching the foregoing map as illustrated in FIG. 9 by use of the values of the multiple operation parameters acquired in S35. More specifically, in S36, the intra-cylinder octane rating is estimated by using the ignition timing (see a triangle mark in FIG. 9) at which the first knocking occurs under the conditions where the engine load is within the high octane rating determination range and the ignition timing is gradually advanced from the normal ignition timing as presented by a broken arrow in FIG. 9, the normal ignition timing being determined in the normal operation mode such as to avoid the occurrence of knocking. Here, in the second learning processing, since the mixed fuel containing the first fuel and the second fuel at a predetermined injection ratio is supplied, the intra-cylinder octane rating obtained from the map in FIG. 9 cannot be used directly as the estimated value of the octane rating of the second fuel unlike the first learning processing. For this reason, in S36, the estimated value of the octane rating of the second fuel is calculated by further using the injection ratio acquired in S35, and the first learned octane rating in addition to the intra-cylinder octane rating obtained from the map in FIG. 9.

In S37, the antiknock property learning part updates the second learned octane rating to the latest value, that is, the estimated value of the octane rating of the second fuel calculated in S36, and proceeds to S38. In S38, the antiknock property learning part changes the second learning completion flag from 0 to 1 to explicitly indicate that the second learned octane rating is updated to the latest value in the second learning processing, and terminates the processing in FIG. 10. After the second learning completion flag is changed to 1 in S38, the second learned octane rating is not updated unless the first learned octane rating is newly updated as a result of execution of the first learning processing again.

Second Embodiment

Next, a second embodiment of the present disclosure is described. In the following description, the second embodiment of the present disclosure is explained mainly in terms of components different from those of the first embodiment, and the same components as those of the first embodiment are omitted from the illustration, explanation and so forth.

Figure 11:
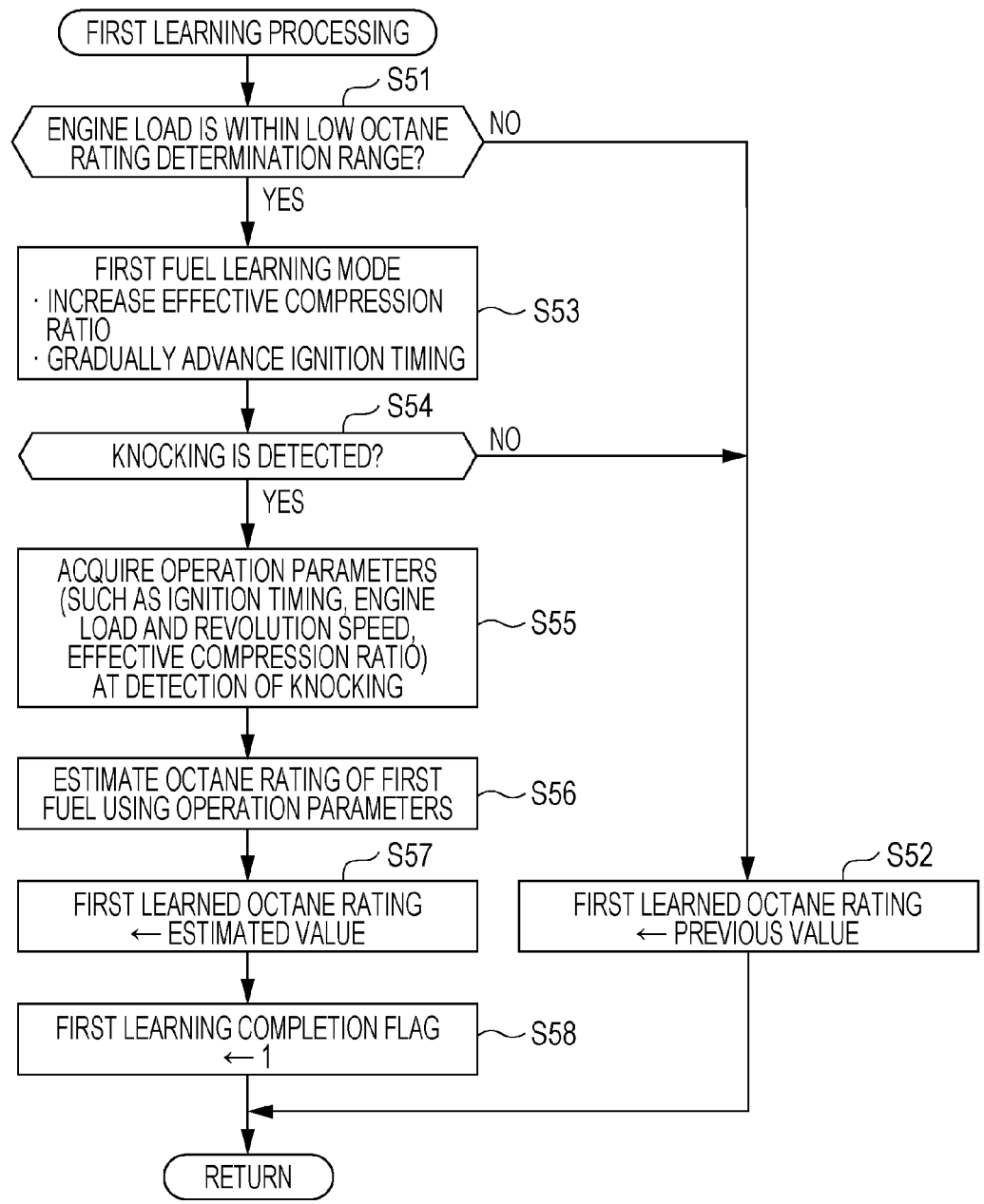
FIG. 11 is a flowchart presenting a procedure of first learning processing in a method of estimating antiknock properties according to a second embodiment of the present disclosure.

FIG. 11 is a flowchart of a specific procedure of first learning processing according to this embodiment.

In S51, the antiknock property learning part determines whether a current engine load is within a low octane rating determination range specified by predetermined lower and upper limit values. If the determination result of S51 is NO, the antiknock property learning part keeps the previous value of the first learned octane rating (see S52), and immediately terminates the processing in FIG. 11. If the determination result of S51 is YES, the antiknock property learning part executes processing in S53 and following steps in order to update the value of the first learned octane rating.

Figure 12:
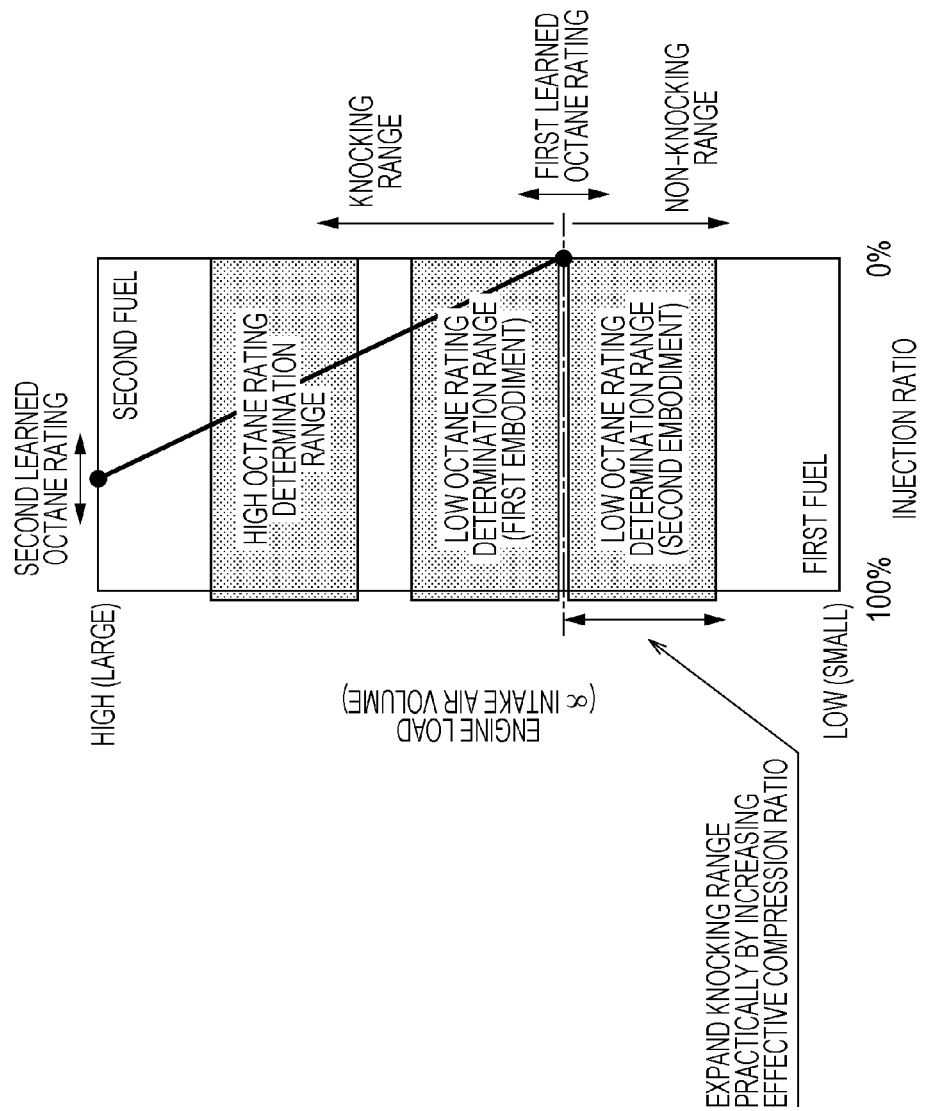
FIG. 12 is a diagram illustrating a relationship between an engine load and an injection ratio.

FIG. 12 is a diagram in which a low octane rating determination range of this embodiment is additionally indicated on the same diagram as the foregoing diagram in FIG. 8. As illustrated in FIG. 12, the low octane rating determination range is set within a predetermined width on a high load side in the non-knocking range in this embodiment.

Again referring to FIG. 11, in S53, the antiknock property learning part switches the engine operation mode from the normal operation mode to the first fuel learning mode, and proceeds to S54. More specifically, in the first fuel learning mode of this embodiment, while the engine load is within the non-knocking range, the effective compression ratio is set to be higher than the effective compression ratio determined in the normal operation mode, so that the knocking range is practically expanded down to the lower limit value of the low octane rating determination range. Thus, the conditions likely to cause knocking are imposed on the engine. At the same time, in the first fuel learning mode of this embodiment, the ignition timing at which the knocking sensor detects first knocking is searched for while the correction value for learning to be added to the value of the normal ignition timing (see FIG. 3) is changed within a predetermined range. A specific procedure of searching for the ignition timing is the same as that in the first fuel learning mode of the first embodiment and the detailed explanation thereof is omitted herein.

In S54, the antiknock property learning part determines whether or not the knocking sensor detects knocking after switching of the engine operation mode to the first fuel learning mode. If the determination result of S54 is NO, the antiknock property learning part proceeds to S52, keeps the previous value of the first learned octane rating, and immediately terminates the processing in FIG. 11. If the determination result of S54 is YES, the antiknock property learning part proceeds to S55, acquires the values of multiple operation parameters specifying engine operation conditions, such as the ignition timing, the engine load, the engine revolution speed, and the effective compression ratio at a time point when the knocking is firstly detected in the first fuel learning mode, and then proceeds to S56.

In S56, the antiknock property learning part calculates an estimated value of the octane rating of the first fuel by searching the foregoing map as illustrated in FIG. 9 by use of the values of the multiple operation parameters acquired in S55. In S57, the antiknock property learning part updates the first learned octane rating to the latest value, that is, the estimated value of the octane rating of the first fuel calculated in S56, and then proceeds to S58. In S58, the antiknock property learning part changes the first learning completion flag from 0 to 1, and terminates the processing in FIG. 11.

Third Embodiment

Next, a third embodiment of the present disclosure is described. In the first embodiment, the first and second learned octane ratings are each updated by using the values of the multiple operation parameters at the time point when the knocking occurs after the engine operation mode is switched from the normal operation mode to the first or second fuel learning mode. In contrast, this embodiment is different in that, while the engine operation mode is kept at the normal operation mode, the first and second learned octane ratings are each updated by using the value of the feedback correction coefficient KAF introduced in the forgoing formulas (1) and (2). In the following description, the third embodiment of the present disclosure is explained mainly in terms of components different from that of the first embodiment, and the same components as those of the first embodiment are omitted from the illustration, explanation and so forth.

Figure 13:
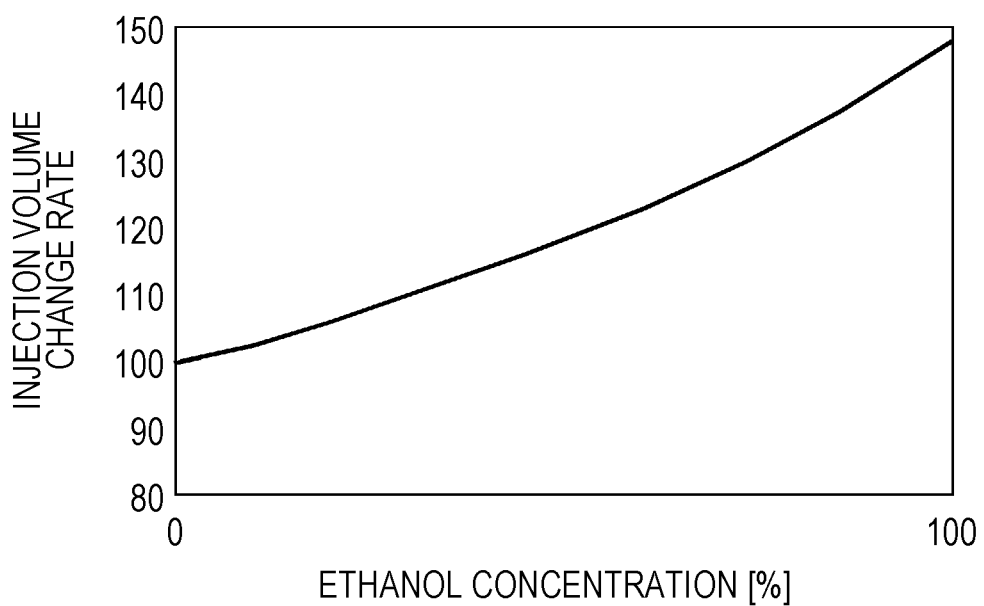
FIG. 13 is a diagram illustrating a relationship between an intra-cylinder ethanol concentration and a change rate of a fuel injection volume from a predetermined reference injection volume.

FIG. 13 is a diagram illustrating a relationship between an ethanol concentration of a fuel in the cylinder (horizontal axis) and a change rate of the fuel injection volume from a predetermined reference injection volume (vertical axis) in the case where the fuel injection volume is controlled in accordance with a feedback control law as presented in the foregoing formula (1) such that the detection value of the air-fuel ratio sensor can become a certain value (for example, a stoichiometric ratio). In the example in FIG. 13, the reference injection volume is a fuel injection volume in the case where a fuel having an ethanol concentration of 0% (that is, gasoline) is used.

The gasoline and the ethanol are different from each other in heat value. For this reason, as illustrated in FIG. 13, the higher the ethanol concentration in the blended fuel (that is, the higher the octane rating), the higher the fuel injection volume necessary to keep the detection value of the air-fuel ratio sensor at a predetermined value. Here, assume that the first learned concentration is 0% and the fuel injection volume is controlled in accordance with the feedback control law of the foregoing formula (1), for example. In this case, the change rate on the vertical axis in FIG. 13 is a change rate with respect to a reference injection volume which is the product of the values "GBS1×KH" in the foregoing formula (1) determined under the first learned concentration, and in other words is equivalent to the feedback correction coefficient KAF exactly.

In the above formulas (1) and (2), the correction coefficient KAF functions to change the fuel injection volume from the reference injection volume, which is determined under a predetermined learned concentration, such that the heat value can be constant regardless of the ethanol concentration in the fuel supplied to the cylinder. Thus, the intra-cylinder octane rating at a given time, and therefore the octane ratings of the first and second fuels at the given time can be estimated by using the reference injection volume, the values of the first and second learned concentrations (or their equivalent first and second learned octane ratings) used to determine the reference injection volume, and the value of the correction coefficient KAF at the given time. The following description is provided for a procedure of estimating antiknock properties of the first and second fuels from the feedback correction coefficient.

Figure 14:
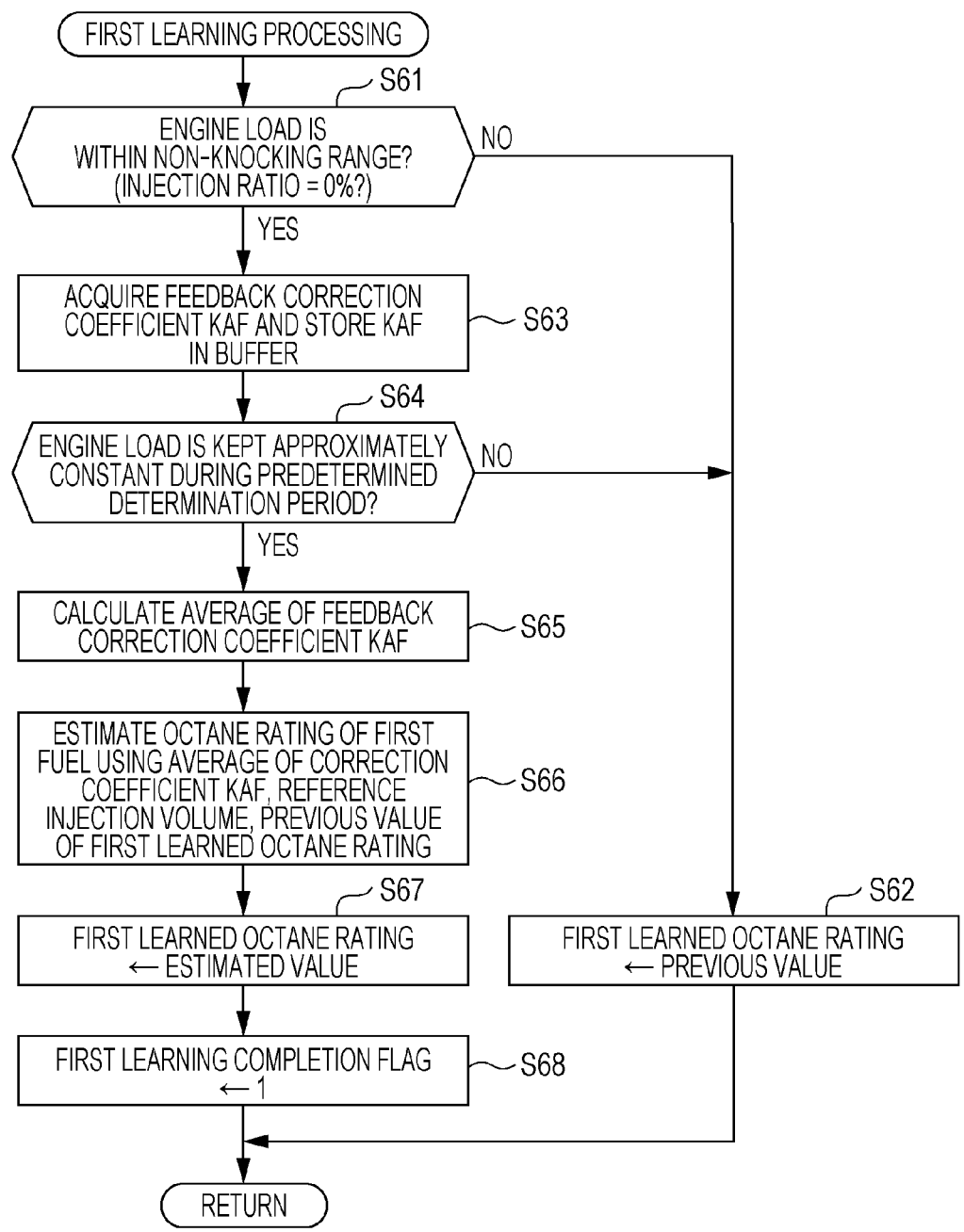
FIG. 14 is a flowchart presenting a procedure of first learning processing in a method of estimating antiknock properties according to a third embodiment of the present disclosure.

FIG. 14 is a flowchart of a specific procedure of the first learning processing according to this embodiment. A main flowchart of the antiknock property learning part in this embodiment is the same as that presented in FIG. 6, and the detailed description thereof is omitted below.

In S61, the antiknock property learning part determines whether or not the engine load is within the non-knocking range (see FIG. 8). If the determination result of S61 is NO, the antiknock property learning part keeps the previous value of the first learned octane rating (see S62), and immediately terminates the processing in FIG. 14. If the determination result of S61 is YES, the antiknock property learning part executes processing in S63 and the following steps in order to update the first learned octane rating to the latest value.

In S63, the antiknock property learning part acquires the current value of the feedback correction coefficient KAF calculated by the injection volume calculator 58 in FIG. 3, stores the acquired value into a predetermined area in a not-illustrated buffer (for example, a ring buffer configured to store the values of the correction coefficient KAF acquired in respective control cycles during a predetermined determination period to be described later), and then proceeds to S64. In S64, the antiknock property learning part determines whether or not the engine load is kept approximately constant during the predetermined determination period. As described above, the value of the correction coefficient KAF changes not only when an error occurs in any of the first and second learned concentrations, but also when the engine is in the transient operation where the engine load varies. If the determination result of S64 is NO, the antiknock property learning part proceeds to S62 in order to continue acquiring the value of the correction coefficient KAF, keeps the previous value of the first learned octane rating, and immediately terminates the processing in FIG. 14. If the determination result of S64 is YES, the antiknock property learning part proceeds to S65.

In S65, the antiknock property learning part calculates the average of the values of the correction coefficient KAF acquired in the respective control cycles during the aforementioned determination period, and proceeds to S66. In S66, the antiknock property learning part estimates the octane rating of the first fuel by using the average of the correction coefficient KAF, the reference injection volume (the product of the values "GBS1×KH" in the foregoing formula (1)) at a time point when the average of the correction coefficient KAF is calculated, and the previous value of the first learned octane rating used to calculate that reference injection volume.

In S67, the antiknock property learning part updates the first learned octane rating to the latest value, that is, the estimated value of the octane rating of the first fuel calculated in S66, and proceeds to S68. In S68, the antiknock property learning part changes the first learning completion flag from 0 to 1, and terminates the processing in FIG. 14.

Figure 15:
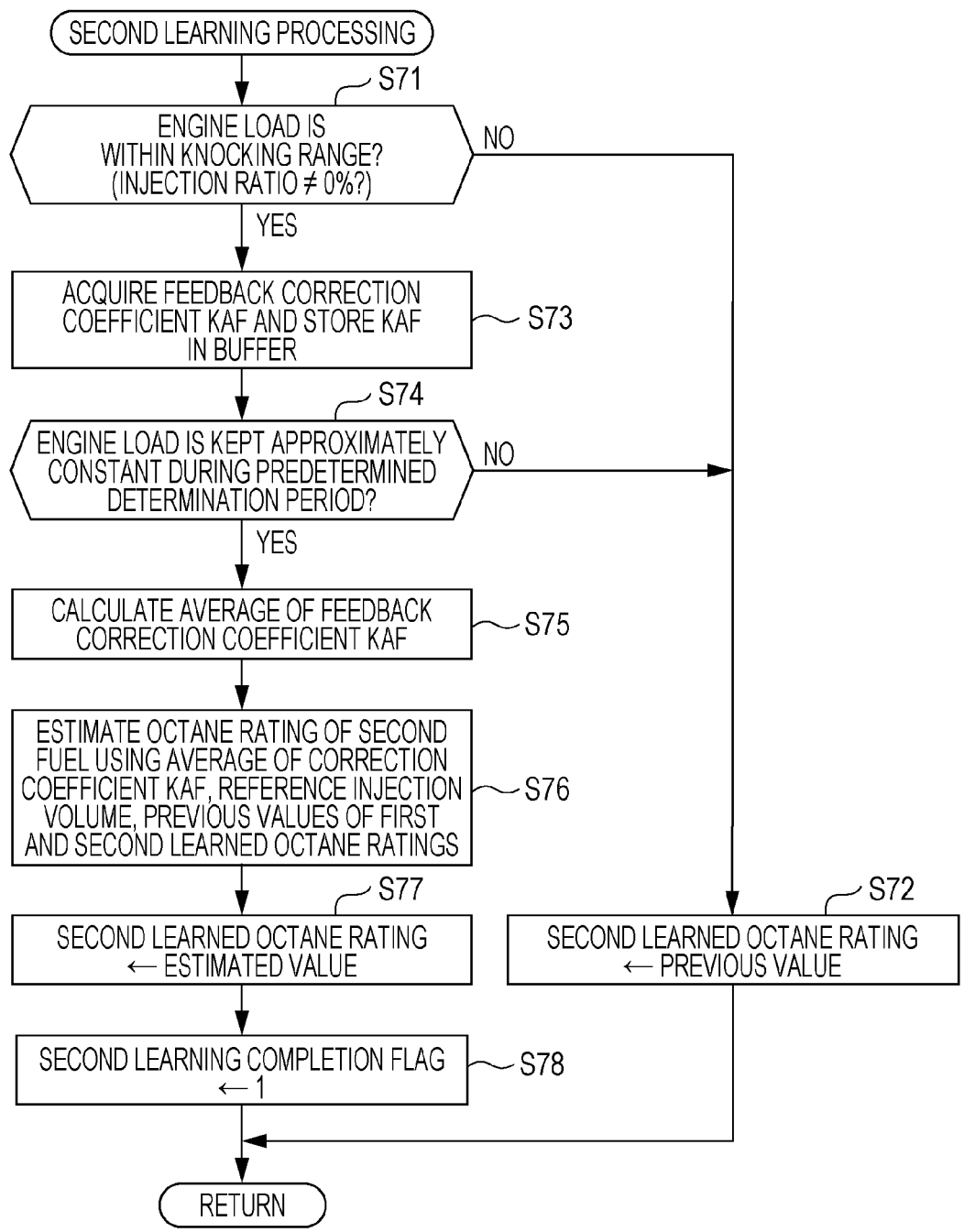
FIG. 15 is a flowchart presenting a procedure of second learning processing.

FIG. 15 is a flowchart illustrating a specific procedure of the second learning processing according to this embodiment.

In S71, the antiknock property learning part determines whether or not the engine load is within the knocking range illustrated in FIG. 8. If the determination result of S71 is NO, the antiknock property learning part keeps the previous value of the second learned octane rating (see S72), and immediately terminates the processing in FIG. 15. If the determination result of S71 is YES, the antiknock property learning part executes processing in S73 and following steps in order to update the second learned octane rating to the latest value.

In S73, the antiknock property learning part acquires the value of the feedback correction coefficient KAF, stores the acquired value into a predetermined area in a not-illustrated buffer as in the first learning processing, and then proceeds to S74. In S74, the antiknock property learning part determines whether or not the engine load is kept approximately constant during a predetermined determination period as in the first learning processing. If the determination result of S74 is NO, the antiknock property learning part proceeds to S72 in order to continue acquiring the value of the correction coefficient KAF, keeps the previous value of the second learned octane rating, and immediately terminates the processing in FIG. 15. If the determination result of S74 is YES, the antiknock property learning part proceeds to S75.

In S75, the antiknock property learning part calculates the average of the values of the correction coefficient KAF acquired in respective control cycles during the aforementioned determination period, and proceeds to S76. In S76, the antiknock property learning part calculates the estimated value of the octane rating of the second fuel by using the calculated average of the correction coefficient KAF, the reference injection volume (the product of the values "(GBS1+GBS2)×KH" obtained by combining the above formulas (1) and (2)) at a time point when the average of the correction coefficient KAF is calculated, and the previous values of the first and second learned octane ratings used to calculate that reference injection volume.

In S77, the antiknock property learning part updates the second learned octane rating to the latest value, that is, the estimated value of the octane rating of the second fuel calculated in S76, and proceeds to S78. In S78, the antiknock property learning part changes the second learning completion flag from 0 to 1, and terminates the processing in FIG. 15.

Heretofore, the embodiments of the present disclosure are described. However, the present disclosure is not limited to those described above. The present disclosure may be modified in specific component portions as needed without departing from the spirit of the present disclosure.

For example, the above embodiments are described for the case where the present disclosure is applied to the vehicle including the separator that separates the blended fuel fed from outside into the first fuel and the second fuel having different octane ratings, but the present disclosure is not limited to this. The present disclosure is applicable to any vehicle not including a separator as long as the vehicle is capable of selectively injecting only one or both of two kinds of fuels having different octane ratings.

In addition, the above embodiments are described for the case where the method of estimating antiknock properties of the present disclosure is applied to the vehicle in which the direct injector directly injects the first fuel having a relatively low octane rating into the cylinder while the port injector injects the second fuel having a relatively high octane rating into the intake port of the engine, but the present disclosure is not limited to this. The present disclosure is also applicable to any vehicle which injects the first fuel into the intake port and directly injects the second fuel into the cylinder, which directly injects both the first and second fuels into the cylinder, or which injects both the first and second fuels into the intake port.

The present application describes a method of estimating antiknock properties of a multi-fuel injection internal combustion engine, the method including estimating the antiknock properties of a low octane fuel and a high octane fuel while minimizing consumption of the high octane fuel.

(1) A method of estimating antiknock properties according to one aspect of the present disclosure is a method of estimating antiknock properties of a multi-fuel injection internal combustion engine that injects a low octane fuel (for example, a first fuel) on a low load side, and injects both of the low octane fuel and a high octane fuel (for example, a second fuel) on a high load side. The method includes a first estimation step (for example, first learning processing in S5 of FIG. 6) of acquiring values of antiknock property-correlated parameters (first antiknock property-correlated parameter values) while only the low octane fuel is injected in a first load range (for example, a low octane rating determination range) (examples of the parameters are an ignition timing, an engine load, an engine revolution speed, an effective compression ratio, and the like at a time point when knocking is detected), and estimating antiknock properties of the low octane fuel (for example, an octane rating, an ethanol concentration, and the like), and a second estimation step (for example, second learning processing in S7 of FIG. 6) of acquiring values of the antiknock property-correlated parameters (second antiknock property-correlated parameter values) while the low octane fuel and the high octane fuel are injected in a second load range (for example, a high octane rating determination range) which is on a load side higher than the first load range, and estimating the antiknock properties of the high octane fuel by using the acquired values and the antiknock properties of the low octane fuel estimated in the first estimation step.

(2) In this aspect, the second estimation step may preferably include: acquiring the values of the antiknock property-correlated parameters while the high octane fuel at a predetermined ratio to the total fuel (for example, an injection ratio) is injected in the second load range; and estimating the antiknock properties of the high octane fuel by using the acquired values, the antiknock properties of the low octane fuel estimated in the first estimation step, and the ratio.

(3) In this aspect, the antiknock property-correlated parameters may preferably be operation parameters specifying operation conditions of the internal combustion engine at a time point when knocking is detected in the internal combustion engine.

(4) In this aspect, the first load range may preferably be a load range (for example, a knocking range) in which a ratio of an injection volume of the high octane fuel to a total injection volume (for example, the injection ratio) is higher than 0, where the ratio is determined in a normal operation mode specified such as to avoid knocking in the internal combustion engine. In the first estimation step, when a load of the internal combustion engine is within the first load range, the injection volumes of the low octane fuel and the high octane fuel may preferably be determined in an estimation operation mode which is different from the normal operation mode. In the estimation operation mode, the ratio of the injection volume of the high octane fuel to the total injection volume may preferably be set to 0.

(5) In this aspect, the first load range may preferably be a load range (for example, a non-knocking range) in which a ratio of an injection volume of the high octane fuel to a total injection volume is 0, where the ratio and an effective compression ratio of the internal combustion engine are determined in a normal operation mode specified such as to avoid knocking in the internal combustion engine. In the first estimation step, when a load of the internal combustion engine is within the first load range, the effective compression ratio may preferably be determined in an estimation operation mode which is different from the normal operation mode. In the estimation operation mode, the effective compression ratio of the internal combustion engine may preferably be determined to be higher than the effective compression ratio determined in the normal operation mode.

(6) In this aspect, the antiknock property-correlated parameters may preferably be a parameter correlated to a change rate of an injection volume of the low octane fuel and the high octane fuel with respect to a predetermined reference injection volume, where the injection volume of the low and high octane fuels is determined based on a feedback control law such that a detection value of an air-fuel ratio sensor provided to an exhaust passage of the internal combustion engine can become a predetermined target value.

(1) According to the aspect of the present disclosure, the load range of the internal combustion engine is divided into the first load range and the second load range on the load side higher than the first load range. In the first load range, only the low octane fuel is injected and the antiknock properties of the low octane fuel are estimated by using the values of the antiknock property-correlated parameters acquired at this time (the first estimation step). In the second load range, both the low octane fuel and the high octane fuel are injected, and the antiknock properties of the high octane fuel are estimated by using the values of the antiknock property-correlated parameters acquired at this time, and the antiknock properties of the low octane fuel estimated in the first estimation step (the second estimation step). According to the aspect of the present disclosure, the estimations of the antiknock properties of the respective fuels are performed at different timings depending on the load of the internal combustion engine, and thus the second estimation step, in particular, is capable of estimating the antiknock properties of the high octane fuel while also injecting the low octane fuel. In other words, it is unnecessary to inject only the high octane fuel to estimate the antiknock properties of the high octane fuel, which can result in saving of consumption of the high octane fuel.

(2) In the second estimation step according to the aspect of the present disclosure, the antiknock properties of the high octane fuel are estimated by using the values of the antiknock property-correlated parameters acquired while the low octane fuel and the high octane fuel are injected, the antiknock properties of the low octane fuel estimated in the first estimation step, and the ratio of the high octane fuel to the total fuel. In this way, the antiknock properties of the high octane fuel can be estimated with high accuracy while both the low octane fuel and the high octane fuel are injected.

(3) In the first and second estimation steps according to the aspect of the present disclosure, the antiknock properties of the two kinds of fuels are estimated by using the operation parameters specifying the operation conditions of the internal combustion engine at the time point when knocking is detected. As described above, the high octane fuel is used to inhibit knocking from occurring particularly in the high load range of the internal combustion engine. According to the aspect of the present disclosure, use of the values of the operation parameters at the occurrence of knocking enables estimation of the antiknock properties while saving the consumption of the high octane fuel.

(4) In the aspect of the present disclosure, the first load range for executing the first estimation step is defined as the load range where the ratio of the injection volume of the high octane fuel to the total injection volume is higher than 0, where the ratio is determined such as to avoid knocking in the predetermined normal operation mode. In other words, the first load range is defined as a load range in which knocking may probably occur in the normal operation mode unless the high octane fuel is injected. In the first estimation step according to the aspect of the present disclosure, while the load of the internal combustion engine is within such first load range, the injection volume of the high octane fuel is set to 0 in the estimation operation mode which is different from the aforementioned normal operation mode, thereby actively causing knocking to estimate the antiknock properties of the low octane fuel. Thus, the antiknock properties of the low octane fuel can be estimated while the consumption of the high octane fuel is saved. In addition, the definition of the first load range as described above makes the injection volume of the low octane fuel larger, and accordingly enables more accurate estimation of the antiknock properties of the low octane fuel.

(5) In the aspect of the present disclosure, the first load range for executing the first estimation step is defined as the load range where the ratio of the injection volume of the high octane fuel to the total injection volume is 0, where the ratio is determined in the normal operation mode. In other words, the first load range is defined as a load range in which there is no need, from the beginning, to inject the high octane fuel in order to avoid knocking in the normal operation mode. In the first estimation step of the aspect of the present disclosure, while the load of the internal combustion engine is within such first load range, the effective compression ratio of the internal combustion engine in the estimation operation mode different from the normal operation mode is set higher than in the normal operation mode, thereby actively causing knocking to estimate the antiknock properties of the low octane fuel. Thus, the antiknock properties of the low octane fuel can be estimated while the consumption of the high octane fuel is saved. In addition, the first estimation step of the aspect (5) of the present disclosure causes knocking in the low load range where the fuel injection volume is smaller than that of the aspect (4) of the present disclosure, and accordingly can reduce the load applied on the internal combustion engine.

(6) In the aspect of the present disclosure, the antiknock property-correlated parameter is the parameter correlated to the change rate of the injection volume of the low octane fuel and the high octane fuel with respect to the predetermined reference injection volume, where the injection volume of the low and high octane fuels is determined such that the detection value of the air-fuel ratio sensor can become the predetermined target value. According to this aspect of the present disclosure, use of the antiknock property-correlated parameter defined in that way enables the estimation of the antiknock properties without causing knocking in the internal combustion engine actually. Thus, it is possible to estimate the antiknock properties of each of the fuels while improving the drivability and reducing the load applied on the internal combustion engine.

Obviously, numerous modifications and variations of the present invention are possible in light of the above teachings. It is therefore to be understood that within the scope of the appended claims, the invention may be practiced otherwise than as specifically described herein.

What is claimed is:

1. A method of estimating antiknock properties of a multi-fuel injection internal combustion engine that injects only a low octane fuel on a low load side and injects both of the low octane fuel and a high octane fuel on a high load side and of controlling an operation of the multi-fuel injection internal combustion engine, the method comprising:

a first estimation step of acquiring a value of an antiknock property-correlated parameter while only the low octane fuel is injected in a first load range, and estimating an antiknock property of the low octane fuel by using the acquired value;

a second estimation step of acquiring a value of the antiknock property-correlated parameter when a current load is determined to be within a second load range which is on a load side higher than the first load range, the low octane fuel and the high octane fuel being injected in the second load range, and estimating an antiknock property of the high octane fuel by using the acquired value and the antiknock property of the low octane fuel estimated in the first estimation step; and a controlling step of controlling the operation the multi-fuel injection internal combustion engine based on the estimated antiknock property of the low octane fuel and the estimated antiknock property of the high octane fuel, wherein the first estimation step is performed in response to a determination that a predetermined wait time has passed following a prior completion of the first estimation step or in response to a determination that a new fuel feeding has been performed, and wherein the antiknock property-correlated parameter is a parameter correlated to a change rate of an injection volume of the low octane fuel and the high octane fuel with respect to a predetermined reference injection volume, the injection volume of the low and high octane fuels being determined based on a feedback control law such that a detection value of an air-fuel ratio sensor provided to an exhaust passage of the internal combustion engine becomes a predetermined target value to allow estimation of the antiknock property of the low octane fuel and the antiknock property of the high octane fuel without causing knocking in the multi-fuel injection internal combustion engine.

2. The method according to claim 1, wherein the second estimation step includes acquiring the value of the antiknock property-correlated parameter while the high octane fuel is injected at a predetermined ratio to the total fuel in the second load range, and estimating an antiknock property of the high octane fuel by using the acquired value, the antiknock property of the low octane fuel estimated in the first estimation step, and the ratio.

3. A method of estimating antiknock properties of a multi-fuel injection internal combustion engine and of controlling an operation of the multi-fuel injection internal combustion engine, the method comprising:

acquiring a first antiknock property-correlated parameter value while only a first fuel having a low octane rating is injected in a first load range;

estimating a first antiknock property of the first fuel based on the first antiknock property-correlated parameter value;

acquiring a second antiknock property-correlated parameter value when a current load is determined to be within a second load range higher than the first load range, the first fuel and a second fuel, which has a high octane rating higher than the low octane rating, being injected in the second load range;

estimating a second antiknock property of the second fuel based on the second antiknock property-correlated parameter value and the first antiknock property of the first fuel; and controlling the operation of the multi-fuel injection internal combustion engine based on the first antiknock property of the first fuel and the second antiknock property of the second fuel, wherein the estimating the first antiknock property is performed in response to a determination that a predetermined wait time has passed following a prior completion of the estimating the first antiknock property or in response to a determination that a new fuel feeding has been performed, and wherein the first antiknock property-correlated parameter value and the second antiknock property-correlated parameter value are values of an antiknock property-correlated parameter that is a parameter correlated to a change rate of an injection volume of the low octane fuel and the high octane fuel with respect to a predetermined reference injection volume, the injection volume of the first and second fuels being determined based on a feedback control law such that a detection value of an air-fuel ratio sensor provided to an exhaust passage of the internal combustion engine becomes a predetermined target value to allow estimation of the antiknock property of the low octane fuel and the antiknock property of the high octane fuel without causing knocking in the multi-fuel injection internal combustion engine.

4. The method according to claim 3, wherein the second antiknock property-correlated parameter value while a total fuel including the second fuel at a predetermined ratio of the total fuel is injected in the second load range is acquired, and the second antiknock property of the second fuel is estimated based on the second antiknock property-correlated parameter value, the first antiknock property of the first fuel, and the predetermined ratio.

5. The method according to claim 3, wherein the second antiknock property-correlated parameter value while a total fuel including the second fuel at a predetermined ratio of the total fuel is injected in the second load range is acquired, and the second antiknock property of the second fuel is estimated based on the second antiknock property-correlated parameter value, the first antiknock property of the first fuel, and the predetermined ratio.

6. The method according to claim 1, wherein the first load range and the second load range do not overlap.

7. The method according to claim 3, wherein the first load range and the second load range do not overlap.

8. The method according to claim 1, wherein the first estimation step and the second estimation step are performed in response to the determination that the predetermined wait time has passed following the prior completion of the first estimation step.

9. The method according to claim 3, wherein the estimating the first antiknock property and the estimating the second antiknock property are performed in response to the determination that the predetermined wait time has passed following the prior completion of the estimating the first antiknock property.

* * * * *